US009160994B2

(12) United States Patent
Yokoyama

(10) Patent No.: US 9,160,994 B2
(45) Date of Patent: *Oct. 13, 2015

(54) INFORMATION STORAGE MEDIUM, TERMINAL DEVICE, DISPLAY SYSTEM, AND A METHOD FOR CONTROLLING A TERMINAL DEVICE

(75) Inventor: Issei Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 13/421,458

(22) Filed: Mar. 15, 2012

(65) Prior Publication Data

US 2012/0236023 A1 Sep. 20, 2012

(30) Foreign Application Priority Data

Mar. 18, 2011 (JP) ................................ 2011-060493

(51) Int. Cl.
*H04N 9/31* (2006.01)
*H04L 12/18* (2006.01)
*H04M 3/56* (2006.01)

(52) U.S. Cl.
CPC .......... *H04N 9/3194* (2013.01); *H04L 12/1822* (2013.01); *H04N 9/3179* (2013.01); *H04M 3/567* (2013.01)

(58) Field of Classification Search
CPC . G06F 3/017; H04L 12/1813; H04L 12/1822; H04M 3/567
USPC ........................................................ 715/810
See application file for complete search history.

(56) References Cited

U.S. PATENT DOCUMENTS

| | | | |
|---|---|---|---|
| 2001/0014184 A1* | 8/2001 | Bubie et al. | 382/293 |
| 2003/0218602 A1* | 11/2003 | Naito | 345/204 |
| 2006/0109517 A1* | 5/2006 | Catalan | 358/302 |
| 2006/0164507 A1* | 7/2006 | Eshkoli et al. | 348/14.09 |
| 2006/0215765 A1* | 9/2006 | Hwang et al. | 375/240.21 |
| 2007/0050729 A1* | 3/2007 | Kawamura et al. | 715/781 |
| 2007/0094698 A1* | 4/2007 | Bountour et al. | 725/132 |
| 2008/0100696 A1* | 5/2008 | Schirdewahn | 348/14.09 |
| 2008/0316295 A1* | 12/2008 | King et al. | 348/14.09 |
| 2009/0235177 A1* | 9/2009 | Saul et al. | 715/740 |
| 2010/0238089 A1* | 9/2010 | Massand | 345/1.1 |
| 2010/0333004 A1* | 12/2010 | Kristiansen et al. | 715/765 |
| 2011/0032562 A1* | 2/2011 | McCuen et al. | 358/1.15 |

OTHER PUBLICATIONS

Epson EasyMP Multi PC Projection Operation Guide Jul. 2010.*
Epson, EasyMP Multi PC Projection Operation Guide, Jul. 2010.

* cited by examiner

*Primary Examiner* — Andrea Long
(74) *Attorney, Agent, or Firm* — ALG Intellectual Property, LLC

(57) ABSTRACT

A terminal device connected with a display device includes: an input unit to which operation information is inputted; an image generating unit which generates a configuration designation image including a position designation area corresponding to a display area of the display device and an icon arrangement area where an icon corresponding to an image that can be designated in relation to the position designation area is arranged; and a setting unit which designates an icon to be arranged in the icon arrangement area in relation to the position designation area, based on the operation information, and thereby sets an image corresponding to the icon as a display image in the display area. The icon includes a first icon corresponding to an image supplied from the terminal device connected with the display device and a second icon corresponding to a predetermined pattern image.

13 Claims, 18 Drawing Sheets

| TIME POINT | EVENT | CPA | CPB | CPC | CPD | PROJECTOR |
|---|---|---|---|---|---|---|
| t1 | NO PARTICIPATION | A | B | C | D | |
| t2 | CPA PARTICIPATES | A | B | C | D | A |
| t3 | CLICK ON TWO-SCREEN DISPLAY MODE BUTTON IMAGE | | | | | A B |
| t4 | CLICK ON FOUR-SCREEN DISPLAY MODE BUTTON IMAGE | | | | | A B / C D |

INFORMATION STORAGE MEDIUM, TERMINAL DEVICE, DISPLAY SYSTEM, AND A METHOD FOR CONTROLLING A TERMINAL DEVICE

The entire disclosure of Japanese Patent Application No. 2011-060493 filed Mar. 18, 2011 is expressly incorporated by reference herein.

BACKGROUND

1. Technical Field

The present invention relates to an information storage medium, a terminal device, a display system, and a method for controlling a terminal device or the like.

2. Related Art

According to the related art, while an image is displayed on a display device such as a projector, temporary switching to a specific image is desired in some cases. Such an image may be an image showing that an image muting period is now proceeding, a user logo image registered in advance by a user, and the like. For example, JP-A-2003-280087 discloses a technique of displaying, by a projector provided with an image muting function, a total black image that shows the entire screen in black or a user logo image during an image muting period. Also, Seiko Epson Corporation's product manual download (online), Liquid Crystal Projector EB-1775W User's Manual, (searched on Mar. 1, 2011), URL: http://dl.epson.jp/support/manual/data/elp/eb1775w/U_GUIDE_1775W.PDF discloses a menu screen where an image to be projected by a projector during an image muting period is selected from among a black image, a blue image, and a user logo image.

However, in the techniques of JP-A-2003-280087 and Seiko Epson Corporation's Liquid Crystal Projector EB-1775W User's Manual, a specific operation such as pressing an operation button allocated specifically for the image muting function needs to be conducted in order to call the image muting function. Therefore, in many cases, the image muting function cannot be called immediately. Thus, there is a problem that images cannot be switched immediately because the specific operation is needed even when switching to a specific image is desired such as in the image muting function.

SUMMARY

An advantage of some aspects of the invention is to provide a program, an information storage medium, a terminal device and a display system or the like with which switching to a predetermined pattern image such as total black image is realized by easy operations.

An aspect of the invention is directed to an information storage medium readable by a computer provided in a terminal device which establishes connection with a display device and sets a source of an image to be displayed on the display device, storing a program that causes the computer to function as: an input unit to which operation information is inputted; an image generating unit which generates a configuration designation image including a position designation area corresponding to a display area of the display device and an icon arrangement area where an icon corresponding to an image that can be designated in relation to the position designation area is arranged; and a setting unit which designates an icon to be arranged in the icon arrangement area in relation to the position designation area on the basis of the operation information and thereby sets an image corresponding to the icon as a display image in the display area. The icon includes a first icon corresponding to an image supplied from the terminal device connected with the display device and a second icon corresponding to a predetermined pattern image.

According to this aspect, an image source and an icon of a pattern image source that is allocated virtually as an image source are arranged in the configuration designation image, and an icon can be designated in relation to the position designation area on the basis of user's operation information. Thus, an image showing a predetermined pattern image can be displayed by an intuitive operation similar to handling of other image sources.

This aspect of the invention may be configured such that the configuration of an overall image of the predetermined pattern image is changed by an intuitive operation similar to handling of other image sources.

This aspect of the invention may be configured such that the overall image including images from plural terminal devices is displayed correctly.

This aspect of the invention may be configured such that an arbitrary pattern image is generated on the terminal device side and can be displayed by the display device, without applying any load of generating the pattern image to the display device side.

This aspect of the invention may be configured such that an arbitrary pattern image can be generated and displayed on the display device side, without applying any load of generating the pattern image to the terminal device side.

This aspect of the invention may be configured such that part or the whole of an image displayed by the display device is temporarily muted by an intuitive operation similar to handling of other image sources.

This aspect of the invention may be configured such that part or the whole of a display area of the display device is temporarily brightened by an intuitive operation similar to handling of other image sources. Thus, meetings and presentations can be enriched further.

This aspect of the invention may be configured such that an image showing a message to other participants attending a meeting, for example, is displayed by an intuitive operation similar to handling of other image sources.

This aspect of the invention may be configured such that a preferred image such as a wallpaper is displayed by an intuitive operation similar to handling of other image sources.

Another aspect of the invention is directed to a terminal device that is connected with a display device and sets an image to be displayed on the display device, including: an input unit to which operation information is inputted; an image generating unit which generates a configuration designation image including a position designation area corresponding to a display area of the display device and an icon arrangement area where an icon corresponding to an image that can be designated in relation to the position designation area is arranged; and a setting unit which designates an icon to be arranged in the icon arrangement area in relation to the position designation area on the basis of the operation information and thereby sets an image corresponding to the icon as a display image in the display area. The icon includes a first icon corresponding to an image supplied from the terminal device connected with the display device and a second icon corresponding to a predetermined pattern image.

According to this aspect, an image source and an icon of a pattern image source that is allocated virtually as an image source are arranged in the configuration designation image, and an icon can be designated in relation to the position designation area on the basis of user's operation information.

Thus, an image showing a predetermined pattern image can be displayed by an intuitive operation similar to handling of other image sources.

This aspect of the invention may provide a display system which displays an image showing a predetermined pattern image by an intuitive operation similar to handling of other image sources.

This aspect of the invention may provide a display system which displays an image showing a predetermined pattern image by an intuitive operation similar to handling of other image sources without applying any load to the display device side.

This aspect of the invention may provide a display system which displays an image showing a predetermined pattern image by an intuitive operation similar to handling of other image sources without applying any load to the terminal device side.

BRIEF DESCRIPTION OF THE DRAWINGS

The invention will be described with reference to the accompanying drawings, wherein like numbers reference like elements.

FIG. 9 shows an example of image transition on each PC and the projector according to the first embodiment.

FIG. 10 shows another example of image transition on each PC and the projector according to the first embodiment.

DESCRIPTION OF EXEMPLARY EMBODIMENTS

Hereinafter, embodiments of the invention will be described in detail with reference to the drawings. It should be noted that the following embodiments are not intended to improperly limit the contents of the invention described in the appended claims. Not all the components of the configurations described hereinafter are necessarily essential components for solving the problems to be solved by the invention.

In the following embodiments, a projector is used as an example of the display device according to the invention, and a personal computer (hereinafter PC) is used as an example of the terminal device according to the invention. However, the invention is not limited to these examples.

First Embodiment

Figure 1:
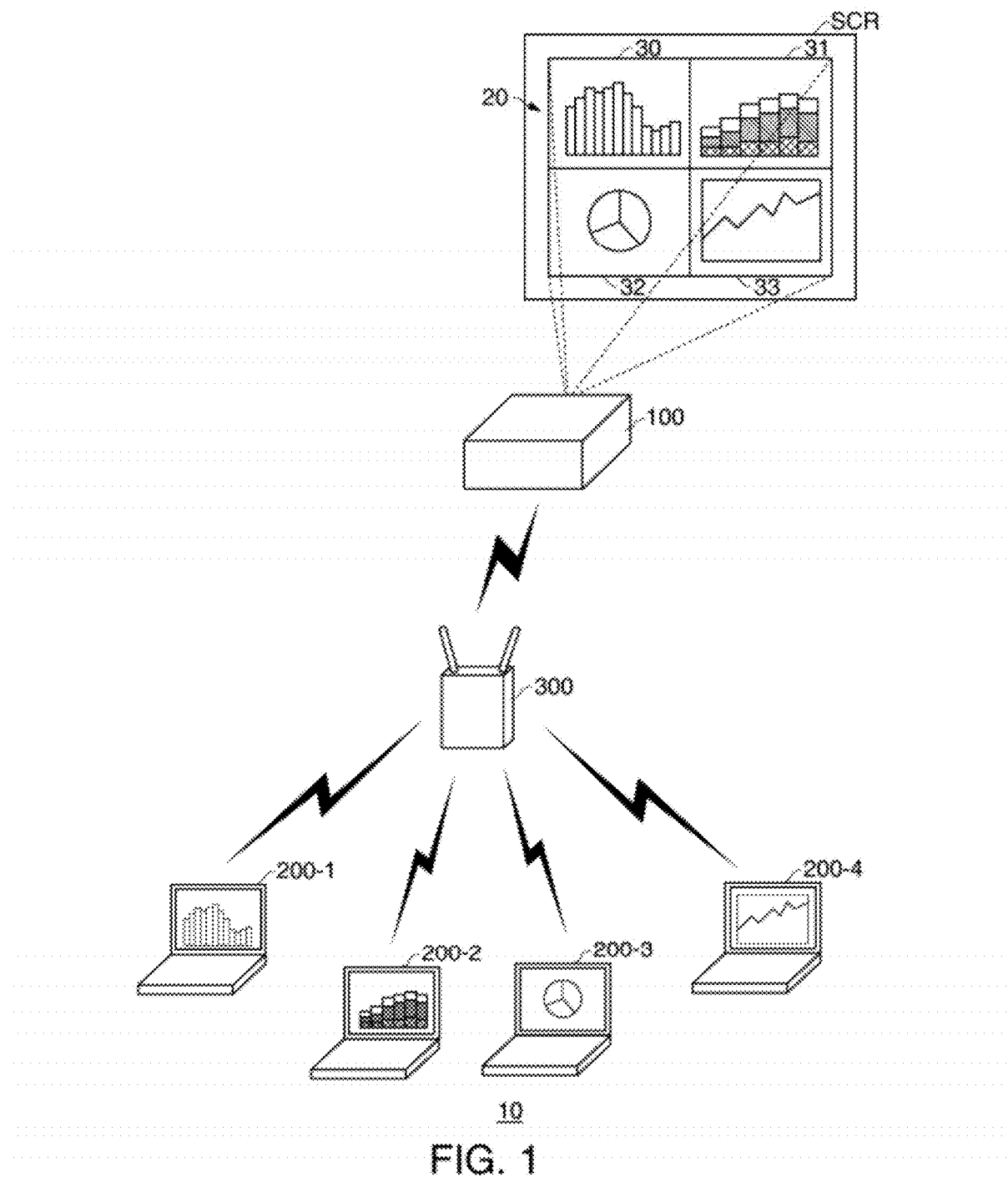
FIG. 1 shows an example of the configuration of a display system according to a first embodiment.

FIG. 1 shows an example of a configuration of a display system according to a first embodiment of the invention.

This display system 10 includes a projector (in a broad sense, a display device) 100, and PCs (in a broad sense, terminal devices) 200-1 to 200-4. In FIG. 1, the projector 100 and the PCs 200-1 to 200-4 are wirelessly connected via an access point 300. The projector 100 can projects, on a screen SCR, an overall image 20 including up to four individual images 30 to 33 based on image information from the PCs 200-1 to 200-4. For example, each of four participants (users) who attend a meeting can change the configuration of the individual images 20 to 33 in the overall image 20 by operating an icon or the like of a configuration designation image displayed on the PC allocated to each participant. In FIG. 1, an image displayed on the screen of each participant's PC is displayed in a corresponding area in the overall image 20. Hereinafter, the PCs 200-1 to 200-4 are assumed to have the same configuration and each of the PCs is referred to as PC 200 when appropriate.

Figure 2:
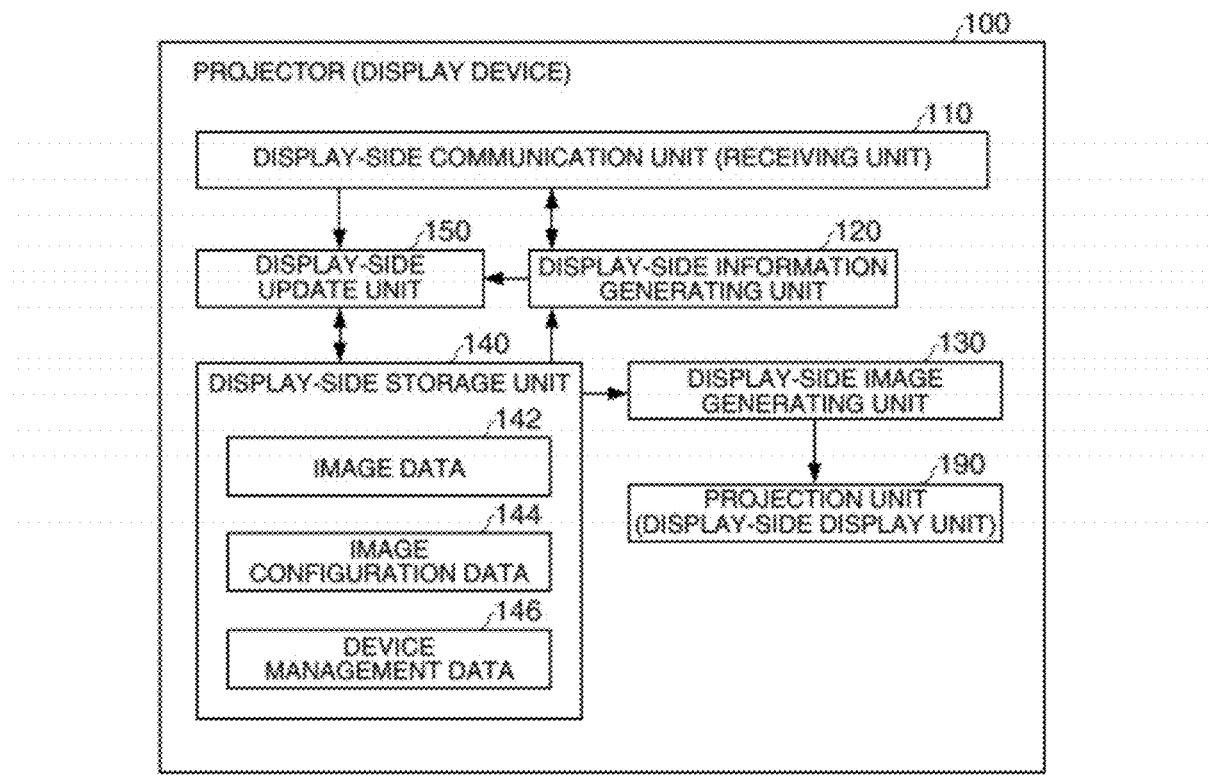
FIG. 2 is a functional block diagram showing an example of the configuration of a projector shown in FIG. 1.

FIG. 2 shows a functional block diagram showing an example of the configuration of the projector 100 shown in FIG. 1.

The projector 100 includes a display-side communication unit (receiving unit) 110, a display-side information generating unit 120, a display-side image generating unit 130, a display-side storage unit 140, a display-side update unit 150, and a projection unit (display-side display unit) 190. The display-side storage unit 140 stores image data 142, image configuration data 144, and device management data 146 or the like. The image data 142 includes image information or the like from the PCs 200-1 to 200-4. The image configuration data 144 represents the configuration of the overall image 20 and the configuration designation image. The device management data 146 represents a communication target device.

The display-side communication unit 110 communicates with the PCs 200-1 to 200-4 via the access point 300 and also functions, for example, as a receiving unit which receives image information or the like from each PC. The display-side information generating unit 120 generates various kinds of information to be transmitted to the PCs 200-1 to 200-4. The display-side image generating unit 130 generates image information corresponding to an image to be displayed on the projection unit 190. At this time, the display-side image generating unit 130 generates the image information using the image data 142. The display-side update unit 150 performs processing to update the data in the display-side storage unit 140. The projection unit 190 projects the image generated by the display-side image generating unit 130 on the screen SCR.

The functions of each unit forming the projector 100 may be realized by hardware. For example, the functions of the display-side communication unit 110 are realized by a wireless communication unit or the like. The functions of the display-side information generating unit 120 and the display-side update unit 150 are realized by a central processing unit (hereinafter CPU) or the like. The functions of the display-side image generating unit 130 are realized by an image processing circuit or the like. The functions of the display-side storage unit 140 are realized by a random access memory (hereinafter RAM) or the like. The projection unit 190 is realized by a lamp, a liquid crystal panel, a liquid crystal drive circuit, a lens and the like.

Figure 3:
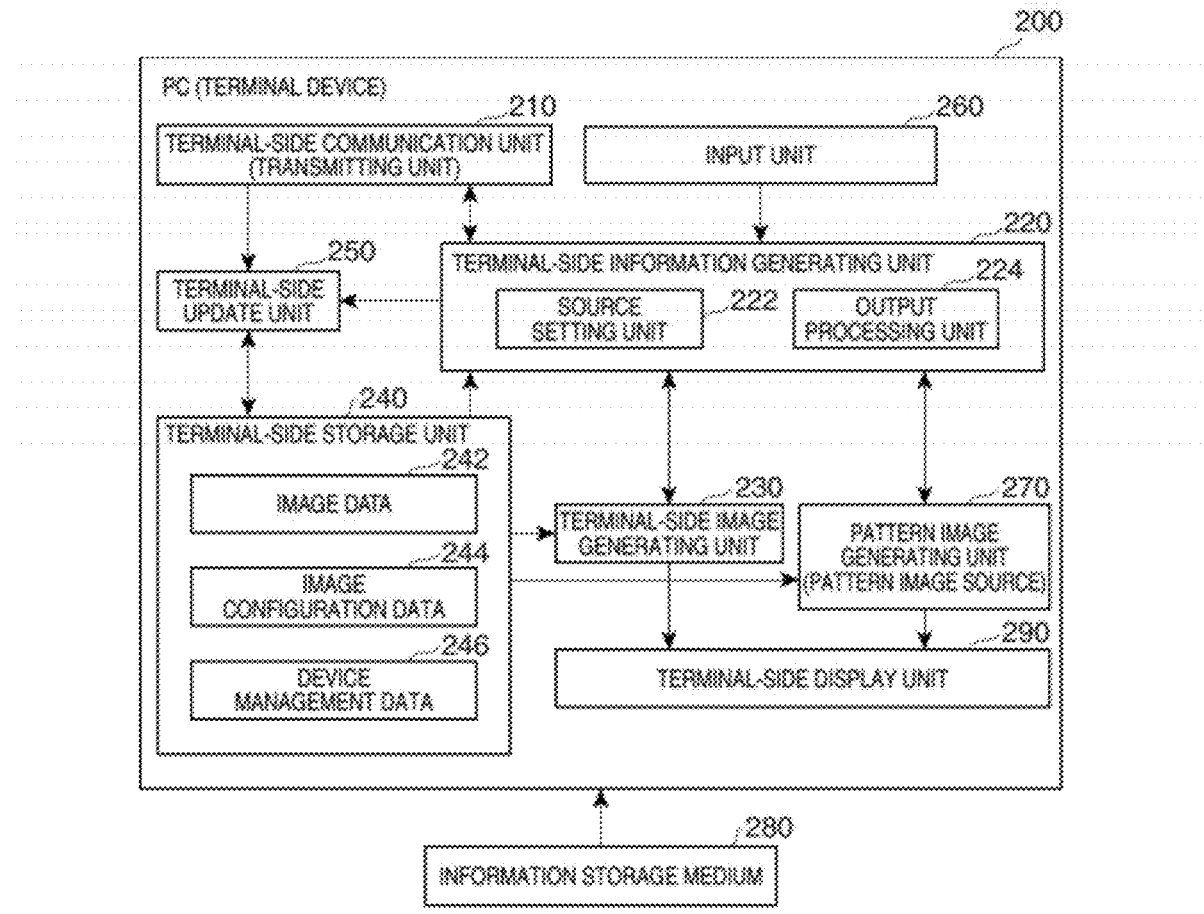
FIG. 3 is a functional block diagram showing an example of the configuration of a PC shown in FIG. 1.

FIG. 3 shows a functional block diagram showing an example of the configuration of the PC 200 shown in FIG. 1.

The PC 200 includes a terminal-side communication unit (transmitting unit) 210, a terminal-side information generating unit 220, a terminal-side image generating unit 230, a terminal-side storage unit 240, a terminal-side update unit 250, an input unit 260, a pattern image generating unit (pattern image source) 270, and a terminal-side display unit 290. The terminal-side information generating unit 220 includes a source setting unit (setting unit) 222 and an output processing unit 224. The terminal-side storage unit 240 stores image data 242, image configuration data 244, and device management data 246 or the like. The image data 242 is image information and the like. The image configuration data 244 represents the configuration of the overall image 20 and the configuration designation image. The device management data 246 represents a communication target device.

The terminal-side communication unit 210 communicates with the projector 100 via the access point 300 and also functions, for example, as a transmitting unit which transmits image information or the like to the projector 100. The terminal-side information generating unit 220 generates various kinds of information to be transmitted to the projector 100. The source setting unit 222 performs setting processing of a source of an image that forms the overall image 20. The output processing unit 224 performs output processing of various kinds of information to the projector 100. The terminal-side image generating unit 230 generates image information corresponding to an image to be displayed on the screen of each participant's PC. For example, the terminal-side image generating unit 230 generates the image information using the image data 242. The terminal-side update unit 250 performs processing to update the data in the terminal-side storage unit 240. To the input unit 260, operation information is inputted by the participant. The pattern image generating unit 270 generates image information corresponding to a predetermined pattern image. The predetermined pattern image may be a total black image, total white image, user logo image, or an image showing text information (text image) or the like. For example, the pattern image generating unit 270 generates the image information using the image data 242. The terminal-side display unit 290 displays the image generated by the terminal-side image generating unit 230 or the pattern image generated by the pattern image generating unit 270. The functions of the pattern image generating unit 270 may be provided in the terminal-side image generating unit 230.

The functions of each unit forming the PC 200 may be realized by hardware. For example, the functions of the terminal-side communication unit 210 are realized by a wireless communication unit or the like. The functions of the terminal-side information generating unit 220 and the terminal-side update unit 250 are realized by a CPU or the like. The functions of the input unit 260 are realized by a USB (universal serial bus) port or the like connected to a keyboard or mouse. The functions of the terminal-side image generating unit 230 and the pattern image generating unit 270 are realized by an image processing circuit or the like. The functions of the terminal-side storage unit 240 are realized by a RAM or the like. The functions of the terminal-side display unit 290 are realized by a backlight, a liquid crystal panel and a liquid crystal drive circuit and the like.

The computer of the PC 200 may function as the terminal-side image generating unit 230 or the like by reading a program stored in an information storage medium 280. Such an information storage medium 280 may be, for example, a CD-ROM (compact disk read only memory), DVD-ROM (digital versatile disk read only memory), ROM (read only memory), RAM, HDD (hard disk drive) or the like.

Next, a procedure for projecting the overall image 20 in response to a configuration change request for an image in the display system 10 will be described. The PC 200 displays a configuration designation image and participants of a meeting carries out an operation while viewing the configuration designation image. Thus, a configuration change request for the overall image is made to the projector 100.

Figure 4:
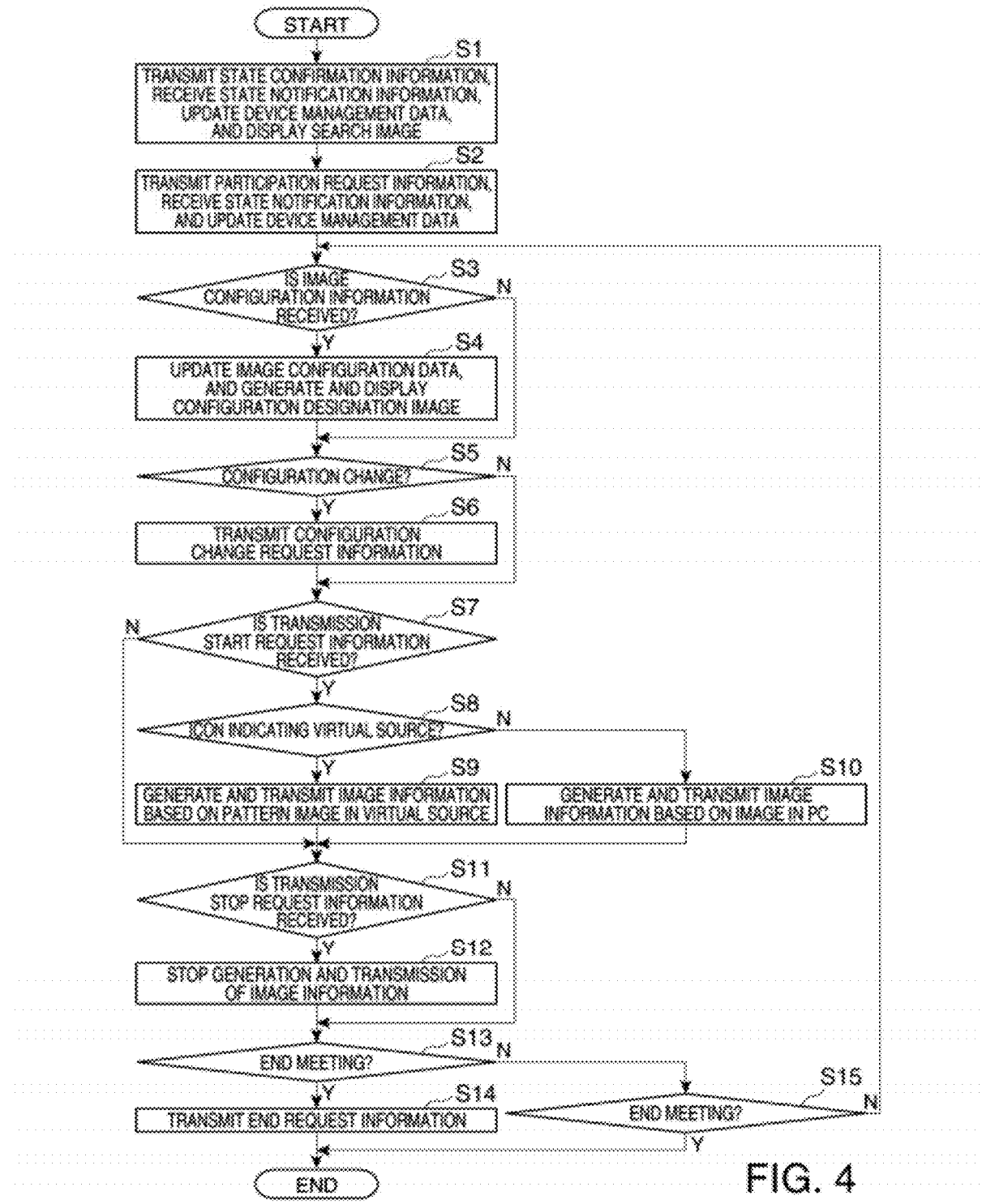
FIG. 4 is a flowchart showing an example of an image display procedure in the PC according to the first embodiment.

FIG. 4 shows a flowchart illustrating an example of an image display procedure in the PC 200 according to the first embodiment.

Figure 5:
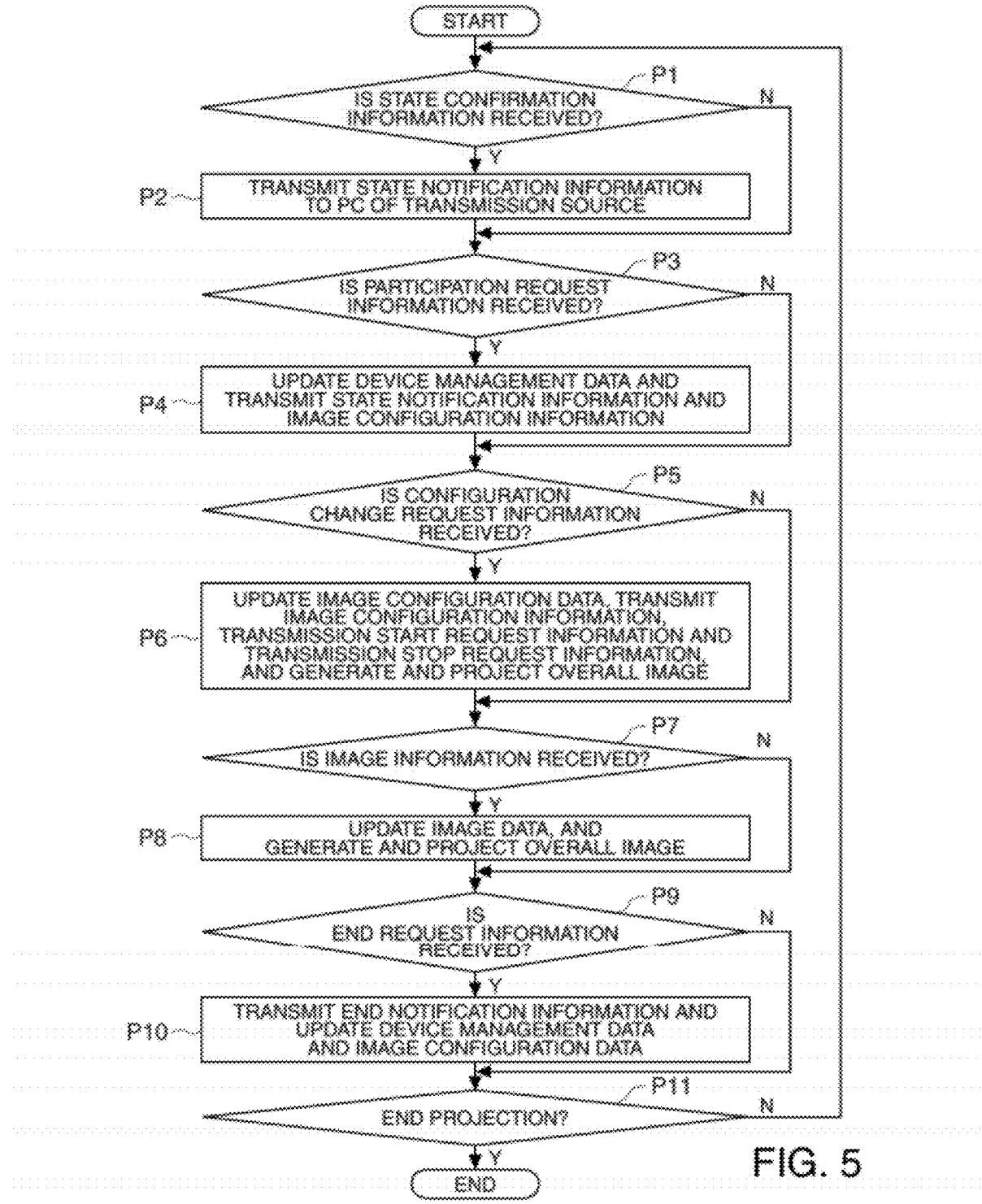
FIG. 5 is a flowchart showing an example of an image display procedure in the projector according to the first embodiment.

FIG. 5 shows a flowchart illustrating an example of an image display procedure in the projector 100 according to the first embodiment.

Figure 6:
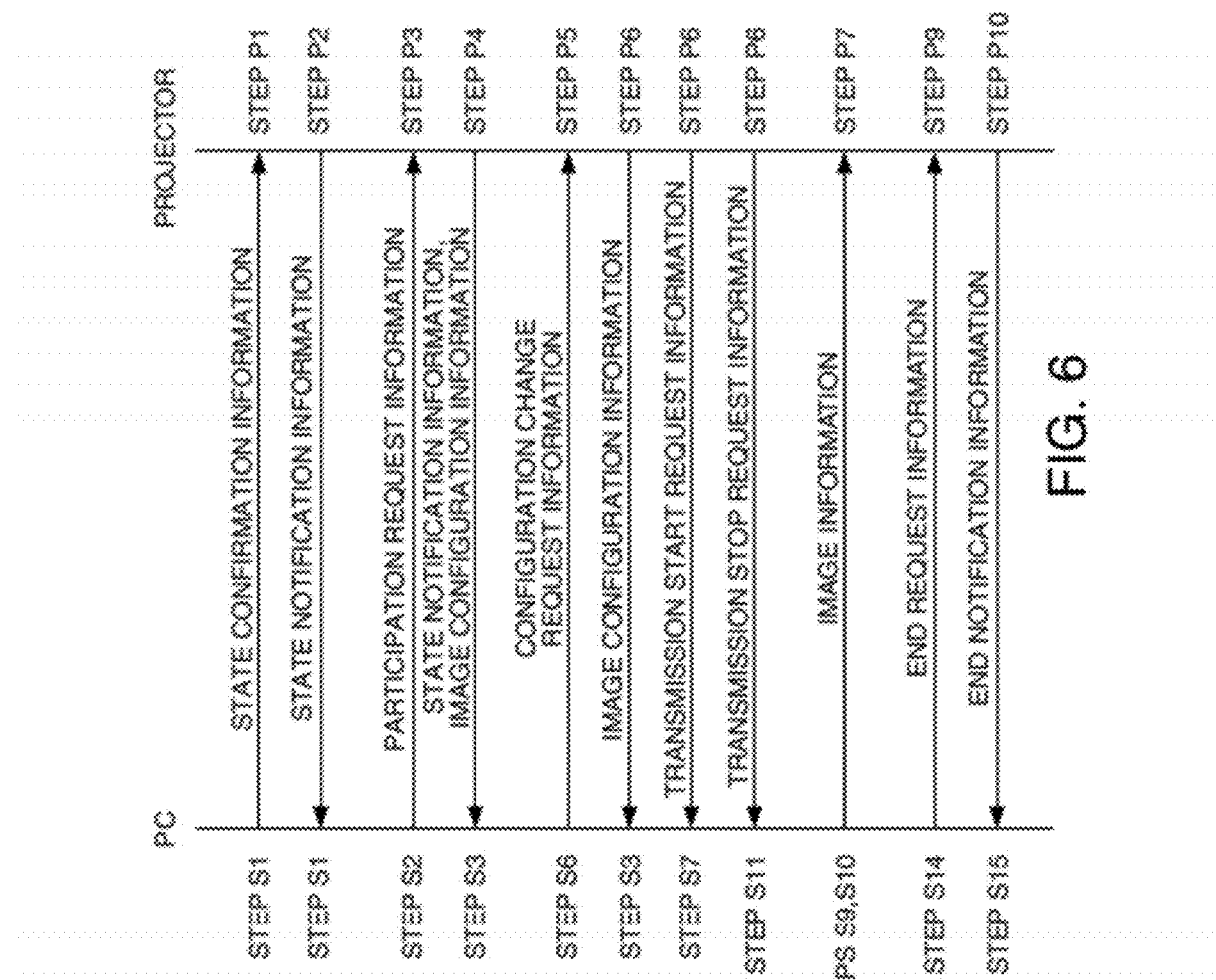
FIG. 6 is a sequence diagram showing exchange of information between the PC and the projector according to the first embodiment.

FIG. 6 shows a sequence diagram illustrating exchange of information between the PC 200 and the projector 100 according to the first embodiment. In FIG. 6, steps corresponding to FIG. 4 and FIG. 5 are shown as well.

First, the image display procedure in the PC 200 will be described with reference to FIG. 4.

The participant of the meeting operates the keyboard, mouse or the like of the participant's PC 200 and thereby gives an instruction to execute a projector search program in order to connect this PC 200 to the projector 100. The projector search program is assumed to be installed in the PC 200 in advance. The terminals-side information generating unit 220 generates state confirmation information to confirm the connection state or the like of each device in the network, based on the information indicating the execution instruction from the input unit 260. The terminal-side communication unit 210 transmits the state confirmation information to the projector 100 and receives state notification information indicating the connection state or the like of each device from the projector 100. The terminal-side update unit 250 updates the device management data 246 based on the state notification information. The terminal-side image generating unit 230 generates a search image showing the result of search for the projector 100 based on the image data 242 and the device management data 246. The terminal-side display unit 290 displays the search image (step S1).

In the search image, the state, projector name, IP (internet protocol) address and the like of the projector 100, and a participation button image or the like for the participant to attend the meeting (for connecting the PC 200 to the projector 100) are shown. The participant uses the mouse or the like of the PC 200 to click the participation button image in the search image and thereby gives an instruction to participate in the meeting. The terminal-side information generating unit 220 generates participation request information based on the information indicating the participation instruction from the input unit 260. The terminal-side communication unit 210 transmits the participation request information to the projector 100 and receives state notification information from the projector 100. The terminal-side update unit 250 updates the device management data 246 based on the state notification information (step S2).

The terminal-side update unit 250 determines whether image configuration information indicating a configuration of a configuration designation image is received by the terminal-side communication unit 210 from the projector 100 or not (step S3). When image configuration information is received (step S3: Y), the terminal-side update unit 250 updates the image configuration data 244 based on the image configuration information. The terminal-side image generating unit 230 generates a configuration designation image based on the image configuration data 244, and the terminal-side display unit 290 displays the configuration designation image (step S4).

Now, the configuration designation image in the first embodiment will be described.

Figure 7:
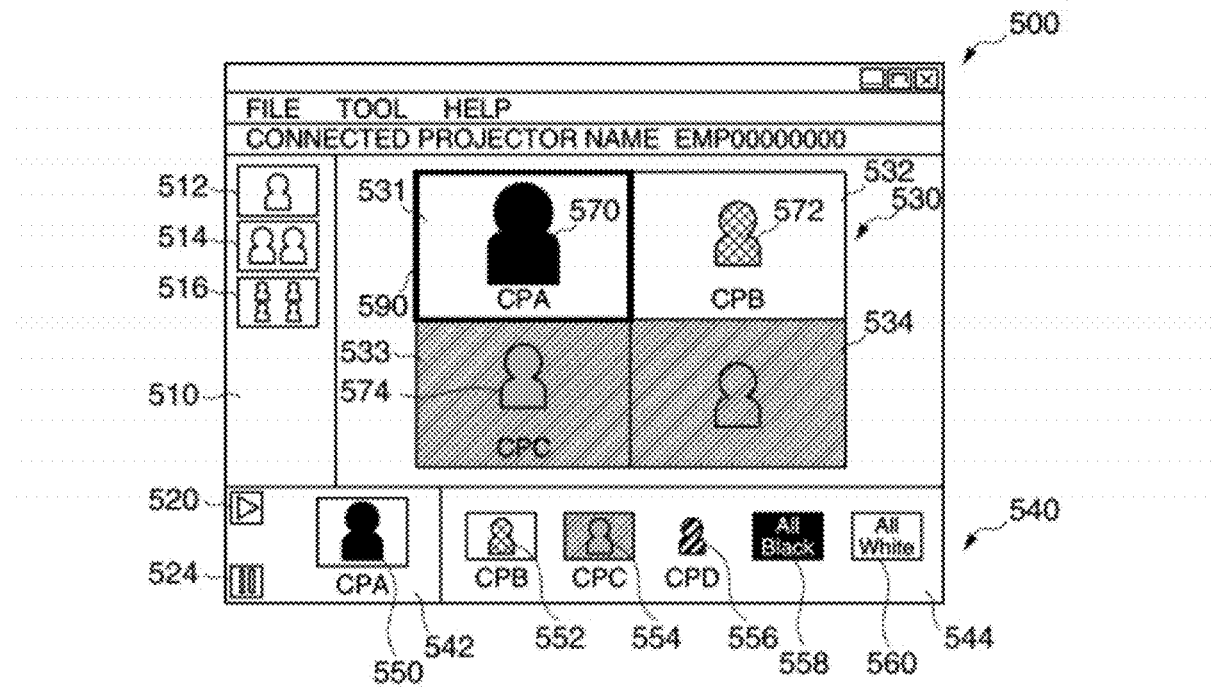
FIG. 7 shows an example of a configuration designation image according to the first embodiment.

FIG. 7 shows an example of the configuration designation image in the first embodiment. This configuration designation image is an image displayed on each of the screens of the PCs 200-1 to 200-4 of FIG. 1. In FIG. 7, the computer name of the PC 200-1 is "CPA", the computer name of the PC 200-2 is "CPB", the computer name of the PC 200-3 is "CPC", and the computer name of the PC 200-4 is "CPD". FIG. 7 shows an example of an image displayed on the screen of the PC 200-1 of FIG. 1.

A configuration designation image 500 includes a display mode selection area 510, a source selection area 530, and an icon arrangement area 540. In the display mode selection area 510, display mode button images 512, 514, 516 for changing the number of individual images that form the overall image 20 are arranged. The display mode button image 512 is a button image for displaying one image in full screen without dividing the display area of the overall image 20. The display mode button image 514 is a button image for simultaneously displaying up to two images by dividing the overall image 20. The display mode button image 516 is a button image for simultaneously displaying up to four images by dividing the overall image 20.

In the source selection area 530, a position designation area corresponding to a projection area of the projector 100 (display area of the display device) is provided. Specifically, in the source selection area 530, one or plural position designation areas corresponding to one or plural division display areas formed by dividing the overall image 20 are provided. In FIG. 7, four position designation areas 531 to 534 in two rows by two columns are provided corresponding to the individual images 30 to 33 forming the overall image 20. Also, in the source selection area 530, a rectangular cursor image 590 or the like is arranged which shifts among the position designation areas 531 to 534 according to the participant's operation and allows the participant to select an individual image to be displayed.

In the icon arrangement area 540, a display button image 520, a pause button image 524, and icons 550, 552, 554, 556, 558, 560 are arranged. The display button image 520 is a button image for giving an instruction to display the overall image 20. The pause button image 524 is a button image for giving an instruction to maintain the display of the current overall image 20. The icons 550, 552, 554, 556 are icons that represent the PCs 200-1 to 200-4 having connection established with the projector 100, respectively, as image sources (video sources). The icons 550, 552, 554, 556 are first icons corresponding to images supplied from the PCs 200-1 to 200-4 connected with the projector 100.

The icon 558 is an icon that represents a pattern image source (pattern vide source) showing a total black image. That is, the icon 558 virtually allocates the pattern image generating unit 270 generating image information corresponding to a total black image held by the PC 200, as an image source, and indicates the pattern image generating unit 270 as a virtual source for selecting a source by a similar operation to operations with respect to image sources. The icon 560 is an icon that represents a pattern image source showing a total white image. That is, the icon 560 virtually allocates the pattern image generating unit 270 generating image information corresponding to a total white image held by the PC 200, as an image source, and indicates the pattern image generating unit 270 as a virtual source. The icons 558 and 560 are second icons corresponding to predetermined pattern images. In the icon arrangement area 540 of FIG. 7, an icon that represents a pattern image source showing a user logo image, and an icon that represents a pattern image source showing text information that is registered in advance may be arranged as second icons, in place of or in addition to the icons 558, 560. The configuration designation image 500 includes menu images representing "File", "Tool", and "Help", an image showing a connected projector name, and so on. FIG. 7 shows that the projector name of the projector 100 is "EMP00000000".

FIG. 7 shows that, in the source selection area 530, a mark image 570 indicating "CPA" is arranged in the top left position designation area 531 and a mark image 572 indicating "CPB" is arranged in the top right position designation area 532. Also, in the source selection area 530, a mark image 574 indicating "CPC" is arranged in the bottom left position designation area 533 and no mark image is arranged in the bottom right position designation area 534. In this case, there are three participants in the meeting. The background of the mark images 570, 572, 574 is white when these images are currently displayed in the overall image 20. The background of the mark images 570, 572, 574 is grey when these images are not currently displayed in the overall image 20. For example, in the example shown in FIG. 7, the background of the mark images 570, 572 is white, indicating that the two individual images of the PCs 200-1, 200-2 are arranged side by side in the overall image 20.

The icon arrangement area 540 also includes an own-device area 542 and an other-device area 544. In the other-device area 544, the icons 552, 554, 556 indicating the other PCs 200 from the left in participation order (in order of connecting to the projector 100), and the icons 558, 560 indicating the virtual sources are arranged. In the own-device area 542, the icon 550 indicating the own device in a fixed manner irrespective of participation order is arranged. The background of the icons 550, 552, 554, 556 changes according to the display state in the source selection area 530. For example, in the example shown in FIG. 7, for the icons 550, 552, which are in a currently displayed state where the mark images thereof are displayed and the individual images thereof are displayed, the background is shown in white. For the icon 554, which is in a display standby state where the mark image thereof is displayed and the individual image thereof is not displayed, the background is shown in grey. For the icon 556, which is in a non-display state where the mark image thereof is not displayed, nothing is shown as the background. Similarly, for the icons 558, 560, too, the color of the background may be changed between the currently displayed state and the non-display state.

Each participant operating each PC 200 can display and operate the search image (not shown) and the configuration designation image 500 on the screen of each PC 200. Each participant changes the image source of an image corresponding to each position designation area in the source selection area 530, for example, by drag-and-dropping the icons 550, 552, 554, 556, 558, 560 from the icon arrangement area 540 to the source selection area 530. That is, each participant can change the configuration of the overall image 20 by drag-and-dropping the icon of a desired image source to each position designation area in the source selection area 530.

Figure 8:
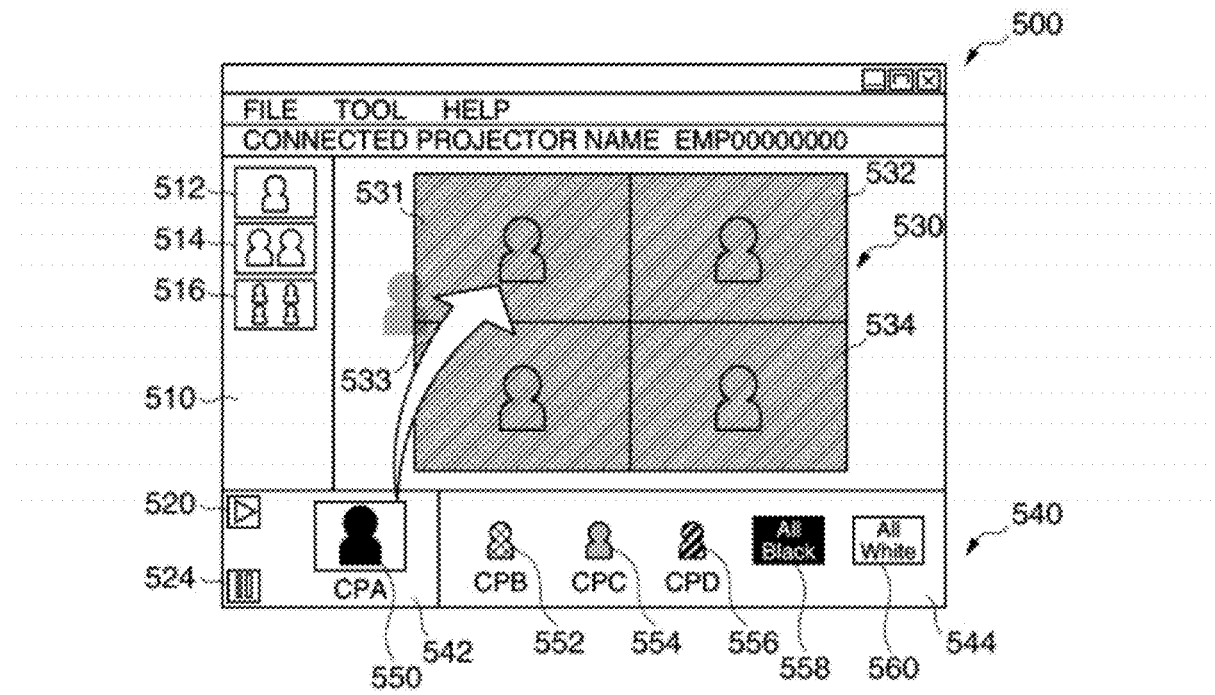
FIG. 8 is an explanatory view showing a drag-and-drop operation by a participant according to the first embodiment.

FIG. 8 shows an explanatory view illustrating the drag-and-drop operation by the participants according to the first embodiment. FIG. 8 shows the configuration designation image 500 similar to FIG. 7. The same parts as in FIG. 7 are denoted by the same reference numerals and the description thereof will be omitted when appropriate.

For example, each participant lays the mouse pointer over the position of the "CPA" icon 550 and clicks on this icon, and in this state, each participant moves the mouse pointer to the position designation area 531 and lifts the finger from the mouse. At this point, while the icon 550 is left in the icon arrangement area 540, an icon in the same form as the icon 550 moves interlocked with the mouse pointer. Thus, the mark image 570 corresponding to the PC 200-1 can be arranged in the position designation area 531 (see FIG. 7). Consequently, the source setting unit 222 performs processing to designate the displaying of an image of an image source or pattern image source corresponding to the icon moved by the drag-and-drop operation, in the display area of the overall image 20. That is, the source setting unit 222 designates an icon to be arranged in the icon arrangement area 540 in relation to the position designation area on the basis of operation information, and thereby sets an image source or pattern image source corresponding to the icon, as a source of a display image in the display area of the overall image 20. When the display area of the overall image 20 are divided into plural division display areas, the source setting unit 222 sets an image source or pattern image source corresponding to an icon designated in relation to position designation area on the basis of operation information, as a source of a display image in the division display area corresponding to each position designation area. Thus, the overall image 20 including the individual image of the PC 200-1 can be projected by the projector 100.

Back to FIG. 4, the description continues.

Following step S4, or when image configuration information is not received in step S3 (step S3: N), the terminal-side information generating unit 220 determines whether there is a change in the configuration by a configuration designation operation or not, based on the information from the input unit 260 (step S5). When there is a change in the configuration (step S5: Y), the terminal-side information generating unit 220 generates configuration change request information that reflects the result designated by the source setting unit 222. The terminal-side communication unit 210 transmits the configuration change request information to the projector 100 (step S6). That is, in step S6, the PC 200 sends a change request to the projector 100 to change the designation of the image source or pattern image source in relation to the position designation area.

Following step S6, or when there is no change in the configuration (step S5: N), the terminal-side information generating unit 220 determines whether transmission start request information for image information is received by the terminal-side communication unit 210 from the projector 100 or not (step S7). When transmission start request information is received (step S7: Y), the PC 200 determines that the foregoing change request is admitted, as a response to the change request made in step S6. Then, the terminal-side information generating unit 220 determines whether the configuration change admitted in step S7 includes a virtual source or not (step S8). When the configuration change includes a virtual source (step S8: Y), the pattern image generating unit 270 generates image information of a pattern image corresponding to the virtual source included in the configuration change. The output processing unit 224 performs output processing including an instruction to transmit the image information from the terminal-side communication unit 210. The terminal-side communication unit 210 transmits the image information to the projector 100 according to the instruction from the output processing unit 224 (step S9). At this point, the terminal-side display unit 290 displays an image corresponding to the image information. In this manner, the output processing unit 224 sends a change request to the projector 100 to change the designation of an image source or pattern image source in relation to the position designation area, and performs processing to output image information to the projector 100 according to a response to the change request. Here, the output processing unit 224 performs processing to output image information corresponding to a predetermined pattern image to the projector 100 when a change request such that an icon corresponding to a pattern image source is designated in relation to the position designation area is admitted on the basis of a response from the projector 100.

Here, when the virtual source indicates a source for displaying a total black image, the output processing unit 224 performs output processing including an instruction to transmit image information corresponding to the total black image from the terminal-side communication unit 210. The total black image may be an image with all the constituent pixels being black, or an image with all the constituent pixels having gradation levels close to black, or an image partly including other pixels than black. Meanwhile, when the virtual source indicates a source for displaying a total white image, the output processing unit 224 performs output processing including an instruction to transmit image information corresponding to the total white image from the terminal-side communication unit 210. The total white image may be an image with all the constituent pixels being white, or an image with all the constituent pixels having gradation levels close to white, or an image partly including other pixels than white. Moreover, when the virtual source indicates a source for displaying text information that is registered in advance, the output processing unit 224 performs output processing including an instruction to transmit image information corresponding to the text information from the terminal-side communication unit 210. However, when the virtual source indicates a source for displaying a user logo image, the output processing unit 224 may instruct the projector 100 via the terminal-side communication unit 210 to directly project a user logo image that is registered in advance in the projector 100, without transmitting image information corresponding to the user logo image to the projector 100.

When the configuration change includes no virtual source in step S8 (step S8: N), the terminal-side image generating unit 230 generates image information representing a graph image or the like on a desktop shown in FIG. 1, based on the image data 242. The terminal-side communication unit 210 transmits the image information to the projector 100 (step S10). At this point, the terminal-side display unit 290 displays an image corresponding to the image information. The terminal-side image generating unit 230 generates the graph image or the like shown in FIG. 1, continuously captures the graph image or the like, and stores the graph image or the like in the terminal-side storage unit 240 as the image data 242. The pattern image generating unit 270 may also continuously capture a pattern image and store the pattern image in the terminal-side storage unit 240 as pattern image data, similarly to the terminal-side image generating unit 230.

Following step S9 or step S10, or when transmission start request information is not received (step S7: N), the terminal-side information generating unit 220 determines whether transmission stop request information for image information is received by the terminal-side communication unit 210 from the projector 100 or not (step S11). When transmission stop request information is received (step S11: Y), the terminal-side image generating unit 230 or the pattern image generating unit 270 stops generating image information and the terminal-side communication unit 210 stops transmitting image information (step S12). In this case, the terminal-side image generating unit 230 or the pattern image generating unit 270 may stop capturing images.

The participant can disconnect the communication of the participant's own PC 200 by selecting "Leave" from a sub-menu of "Tool" in the configuration designation image 500. Moreover, the participant can disconnect the communication of all the PCs 200 by selecting "End Meeting" from the sub-menu. Following step S12, or when transmission stop request information is not received (step S11: N), the terminal-side information generating unit 220 determines whether "End Meeting" is selected or not, based on operation information from the input unit 260 (step S13). When "End Meeting" is selected (step S13: Y), the terminal-side information generating unit 220 generates end request information. The terminal-side communication unit 210 transmits the end request information to the projector 100 (step S14).

When "End Meeting" is not selected (step S13: N), the terminal-side information generating unit 220 determines whether end notification information transmitted from the projector 100 in response to the reception of end request information is received by the terminal-side communication unit 210 or not (step S15). Following step S14, or when end notification information is received (step S15: Y), the PC 200 ends the series of processing (END). When end notification information is not received in step S15 (step S15: N), the PC 200 returns to step S3 and repeats execution of the processing of steps S3 to S15.

Meanwhile, when "End Meeting" is selected in step S13, the terminal-side information generating unit 220 may generates a confirmation image showing character strings such as "All the users attending the meeting will be disconnected from the projector and the search screen will be back. Do you want to end the meeting?" Also, when end notification information is received in step S15, the terminal-side information generating unit 220 may generate a notification image showing character strings such as "Other users have ended the meeting. The search screen will be back."

Next, the image display procedure in the projector 100 will be described with reference to FIG. 5.

The display-side information generating unit 120 determines whether state confirmation information is received by the display-side communication unit 110 from the PC 200 or not (step P1). When state confirmation information is received (step P1: Y), the display-side information generating unit 120 generates state notification information based on the device management data 146. The display-side communication unit 110 transmits the state notification information to the PC 200 of the transmission source (step P2).

Following step P2, or when state confirmation information is not received (step P1: N), the display-side update unit 150 determines whether participation request information is received by the display-side communication unit 110 from the PC 200 or not (step P3). When participation request information is received (step P3: Y), the display-side update unit 150 updates the device management data 146 based on the participation request information. The display-side information generating unit 120 generates state notification information based on the device management data 146 and generates image configuration information based on the image configuration data 144 according to the circumstances. The display-side communication unit 110 transmits the state notification information and the image configuration information to each of the currently participating PCs 200 (step P4).

Following step P4, or when participation request information is not received (step P3: N), the display-side update unit 150 determines whether configuration change request information is received by the display-side communication unit 110 from the PC 200 or not (step P5). When configuration change request information is received (step P5: Y), the display-side update unit 150 updates the image configuration data 144 based on the configuration change request information. Also, in this case, the display-side information generating unit 120 generates image configuration information based on the image configuration data 144 and generates transmission start request information and transmission stop request information according to the circumstances. More specifically, for example, when a new individual image needs to be displayed, the display-side information generating unit 120 generates transmission start request information to the PC 200 that is the transmission source of image information of the individual image. When an individual image no longer needs to be displayed, the display-side information generating unit 120 generates transmission stop request information to the PC 200 that is the transmission source of image information of the individual image. The display-side communication unit 110 transmits the image configuration information, the transmission start request information and the transmission stop request information to each of the currently participating PCs 200. The display-side image generating unit 130 generates an overall image 20 according to the configuration of the image, based on the image data 142 and the image configuration data 144, and the projection unit 190 projects the overall image 20 (step P6).

Following step P6, or when configuration change request information is not received in step P5 (step P5: N), the display-side update unit 150 determines whether image information is received by the display-side communication unit 110 from the PC 200 or not (step P7). When image information is received (step P7: Y), the display-side update unit 150 updates the image data 142 based on the image information. Also, in this case, the display-side image generating unit 130 generates an overall image 20 based on the image data 142 and the image configuration data 144, and the projection unit 190 projects the overall image 20 (step P8). Meanwhile, when an instruction to display a user logo image is given from the PC 200 in step P8, the projection unit 190 projects an overall image 20 including a user log image generated by the display-side image generating unit 130.

Following step P8, or when image information is not received in step P7 (step P7: N), the display-side information generating unit 120 determines whether end request information is received by the display-side communication unit 110 from the PC 200 or not (step P9). When end request information is received (step P9: Y), the display-side information generating unit 120 generates end notification information. The display-side communication unit 110 transmits the end notification information to each PC 200. As the meeting ends, the display-side update unit 150 updates the device management data 146 and the image configuration data 144, for example, to initial states or the like (step P10).

Following step P10, or when end request information is not received in step P9 (step P9: N), the projector 100 determines whether a projection end instruction is given or not (step P11). When a projection end instruction is given (step P11: Y), the projector 100 ends the foregoing series of processing (END). When a projection end instruction is not given (step P11: N), the projector 100 returns to step P1 and the display-side information generating unit 120 determines whether state confirmation information is received by the display-side communication unit 110 from the PC 200 or not.

Next, image transition on the projector 100 and the PCs 200-1 to 200-4 will be described further in detail.

FIG. 9 shows an example of image transition on each PC and the projector in the first embodiment. FIG. 9 schematically shows configuration designation images displayed on the screen of each PC and overall images 20 projected by the projector 100 at consecutive time points t1 to t4. In FIG. 9, to simplify the explanation, the PC 200-1 ("CPA") displays an image A, the PC 200-2 ("CPB") displays an image B, the PC 200-3 ("CPC") displays an image C, and the PC 200-4 ("CPD") displays an image D in the respective division display areas formed by dividing the display area of the overall image 20.

Figure 10:
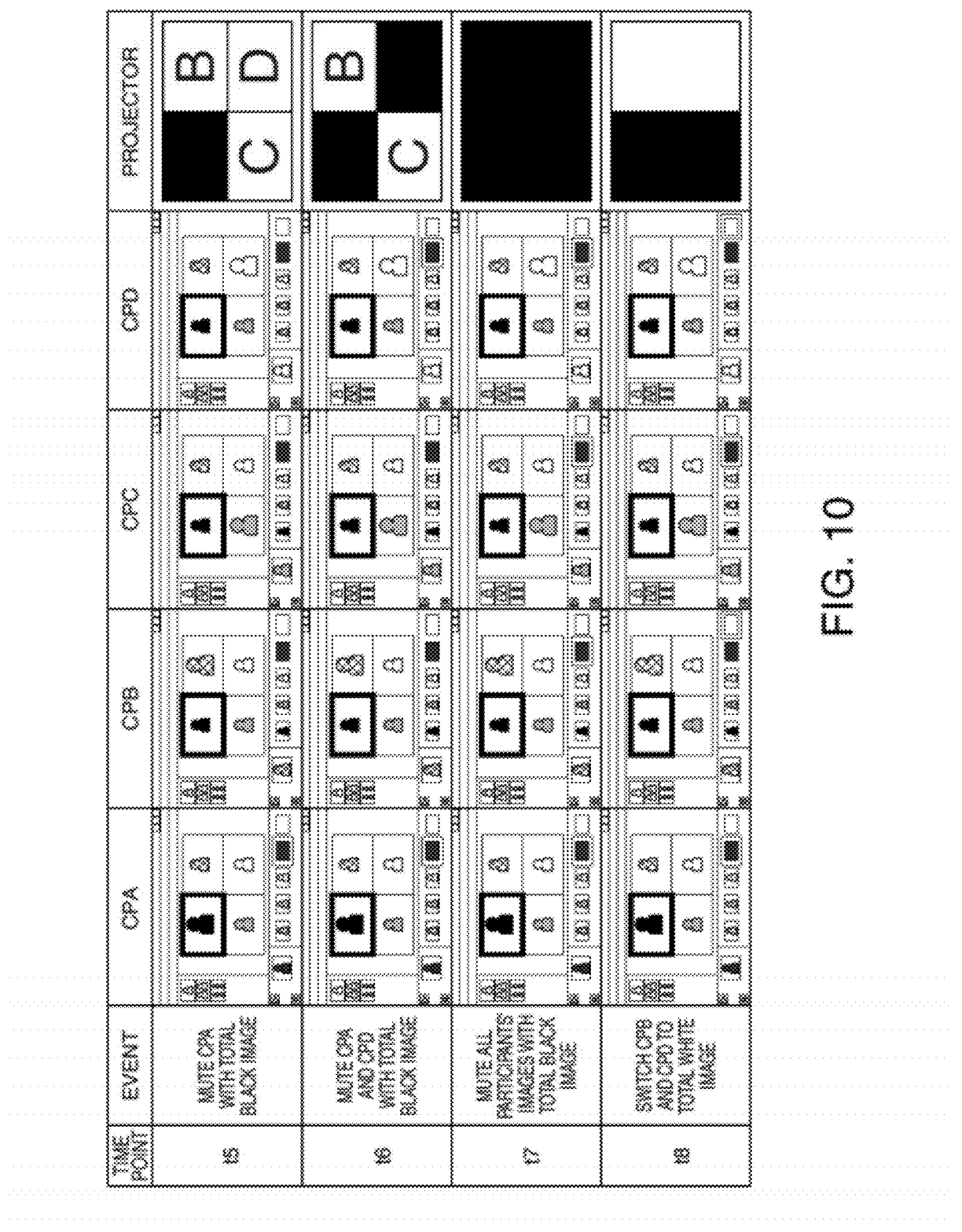

FIG. 10 shows another example of image transition on each PC and the projector in the first embodiment. FIG. 10 schematically shows configuration designation images displayed on the screen of each PC and overall images 20 projected by the projector 100 at consecutive time points t5 to t8 after time point t4. In FIG. 10, the PCs 200-1 to 200-4 display images A to D, respectively, as in FIG. 9.

At time point t1 shown in FIG. 9, there is no PC 200 participating in the meeting and the projector 100 projects a single-color image. If "CPA" participates in the first meeting at time point t2 after time point t1, the projector 100 projects an overall image 20 including the image A of "CPA" according to this participation. In this case, the background of the top left position designation area 531 in the source selection area 530 on each PC 200 changes from grey to white.

After that, "CPB" participates. At this point, the projector 100 does not automatically project the image B and continues projecting the overall image 20 including the image A of "CPA". That is, the projector 100 automatically projects the image of the first participating PC 200, irrespective of whether there is an explicit display instruction or not, but does not project the images of the second and subsequent participating PCs 200 unless there is an explicit display instruction.

At time point t3, the participant who operates "CPA" drag-and-drops the icon of "CPB" to the top right area of the source selection area 530 in the configuration designation image 500 displayed on the PC 200-1. At this point, since the display mode is still of one screen, the overall image 20 projected by the projector 100 does not change, but a mark image corresponding to that icon is added to the source selection area 530. Then, the participant who operates "CPA" clicks on the two-screen display mode button image 512 in the configuration designation image 500 displayed on the PC 200-1. Consequently, the projector 100 projects an overall image 20 including the image A and the image B corresponding to the mark images located at the row position where the cursor image 590 exists. In this case, the background of the top right position designation area 532 in the source selection area 530 on each PC 200 changes from grey to white.

After that, "CPC" and "CPD" similarly participate and the participant who operates "CPA" drag-and-drops the icons of CPC and CPD to the bottom left area and the bottom right area of the source selection area 530 in the configuration designation image 500 displayed on the PC 200-1. If, at point t4, the participant who operates "CPA" clicks on the four-screen display mode button image 514 in the configuration designation image 500 displayed on the PC 200-1, the projector 100 projects an overall image 20 including the image A, the image B, the image C and the image D corresponding to the respective mark images provided in the source selection area 530. In this case, the background of the bottom left position designation area 533 and the bottom right position designation area 534 in the source selection area 530 on each PC 200 changes from grey to white.

At time point t5 shown in FIG. 10, the participant who operates "CPA" drag-and-drops the icon showing a total black image to the top left area of the source selection area in the configuration designation image 500 displayed on the PC 200-1. At this point, the projector 100 projects an overall image 20 including a total black image, the image B, the image C and the image D, as designated in the source selection area 530. Thus, the image A of "CPA" can be temporarily muted by an intuitive operation similar to handling of other image sources.

At time point t6, the participant who operates "CPA" drag-and-drops the icon of virtual source showing a total black image to the bottom right area of the source selection area in the configuration designation image 500 displayed on the PC 200-1. At this point, the projector 100 projects an overall image 20 including a total black image, the image B, the image C, as designated in the source selection area 530. Thus, the image D of "CPD" can be temporarily muted by an intuitive operation similar to handling of other image sources.

At time point t7, the participant who operates "CPA" drag-and-drops the icon of virtual source showing a total black image to the top right area and the bottom left area of the source selection area in the configuration designation image 500 displayed on the PC 200-1. At this point, the projector 100 projects an overall image 20 that is entirely black, as designated in the source selection area 530. Thus, the overall image 20 can be temporarily muted by an intuitive operation similar to handling of other image sources.

After that, at time point t8, the participant who operates "CPA" drag-and-drops the icon of virtual source showing a total white image to the top right area and the bottom right area of the source selection area in the configuration designation image 500 displayed on the PC 200-1. At this point, the projector 100 projects an overall image 20 with a black left half and a white right half, as designated in the source selection area 530. Thus, the overall image 20 including a total white image can be projected by an intuitive operation similar to handling of other image sources. In this case, the display area of the total white image is brightened. Therefore, for example, when a white board is used as a projection surface, what is written on the white board can become more visible and meetings and presentations can be enriched further. Meanwhile, if the icon of virtual source showing a total white image is drag-and-dropped to the four position designation areas, the projector 100 can project, for example, an overall image 20 that is entirely white.

Although FIG. 10 illustrates an example where a total black image or a total white image is shown as a virtual source, an image including a user logo image or text information as a virtual source may also be displayed.

Figure 11:
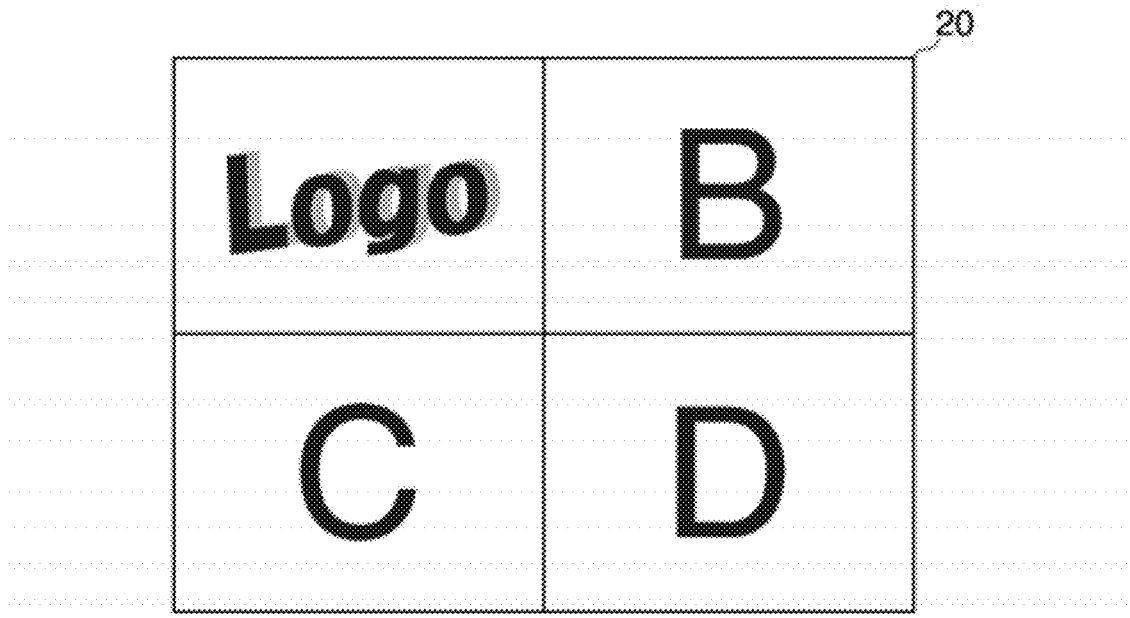
FIG. 11 schematically shows an example of an overall image in a case where an icon showing a user logo image is designated as a virtual source.

FIG. 11 schematically shows an example of the overall image 20 projected by the projector 100 in the case where an icon showing a user logo image as a virtual source is designated. In FIG. 11, images corresponding to each PC are shown, as in FIG. 9 or FIG. 10.

For example, it is assumed that, at time point t5 shown in FIG. 10, the participant who operates "CPA" drag-and-drops the icon showing a user logo image to the top left area of the source selection area in the configuration designation image 500 displayed on the PC 200-1. At this point, the projector 100 projects an overall image 20 including a user logo image that is registered in advance, the image B, the image C and the image D, as designated in the source selection area 530. Thus, a preferred image such as a wallpaper can be displayed by an intuitive operation similar to handling of other image sources.

Figure 12:
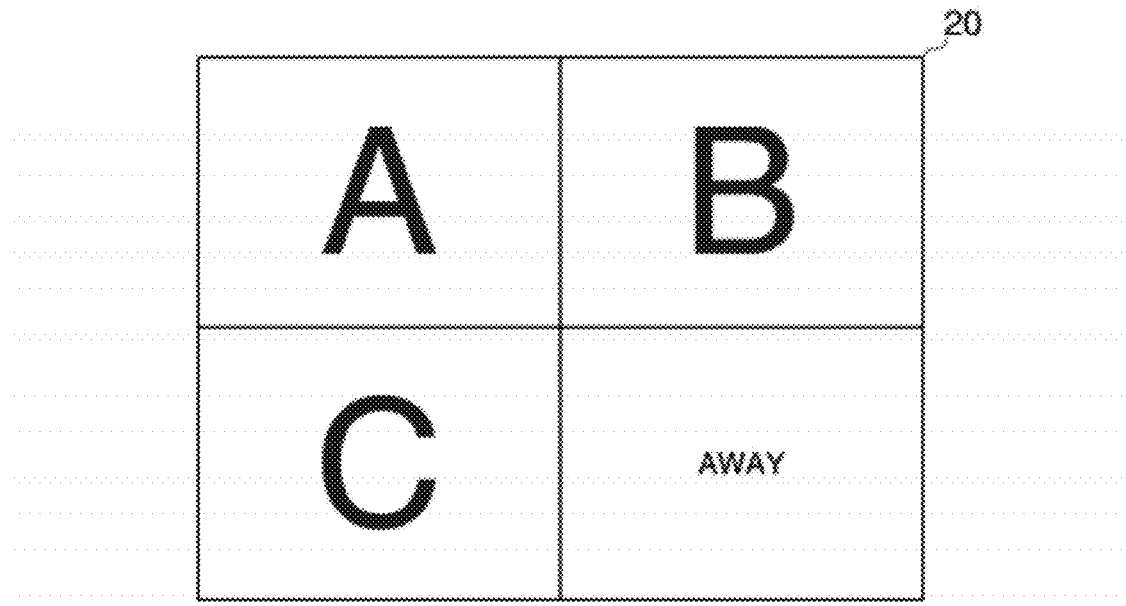
FIG. 12 schematically shows an example of an overall image in a case where an icon showing text information is designated as a virtual source.

FIG. 12 schematically shows an example of the overall image 20 projected by the projector 100 in the case where an icon showing text information as a virtual source is designated. In FIG. 12, images corresponding to each PC are shown, as in FIG. 9 or FIG. 10.

For example, it is assumed that, at time point t5 shown in FIG. 10, the participant who operates "CPA" drag-and-drops the icon showing a user logo image to the bottom right area of the source selection area in the configuration designation image 500 displayed on the PC 200-1. At this point, the projector 100 projects an overall image 20 including the image A, the image B, the image C and text information that is registered in advance, as designated in the source selection area 530. In FIG. 12, information showing "Away" is registered in advance as text information. Thus, an image showing a message or the like to other participants attending the meeting can be displayed by an intuitive operation similar to handling of other image sources.

As described above, according to the first embodiment, the PC 200 can generate and display the configuration designation image 500 including the source selection area 530 for designating the configuration of the individual images 30 to 33 in the overall image 20 displayed by the projector 100. Thus, the configuration of the overall image 20 can be presented in a way that is easy to understand to participants of the meeting. In the configuration designation image 500, a pattern image generating unit which generates image information corresponding to a predetermined pattern image is allocated virtually as an image source and is shown in the form of an icon that can be designated. Thus, a predetermined pattern image can be displayed in the overall image by an intuitive operation similar to handling of other image sources.

In the first embodiment, the PC 200 generates an image that shows the icon 550 of the own device in a different form from the icons 552 to 556 of the other terminal devices and the virtual source icons 558, 560, in the icon arrangement area 540. Thus, the participant can more easily operate the icon 550 of the own device that is operated more frequently than the icons 552 to 556 of the other terminal devices and the virtual source icons 558, 560. Therefore, when the overall image 20 including individual images based on image information from the PC 200 is displayed by the projector 100, operations for changing the configuration of the overall image 20 can be carried out more easily. Thus, when each participant changes the configuration of the overall image 20 using each participant's PC 200, each participant can carry out desired operations efficiently.

Moreover, according to the first embodiment, as the PC 200 fixes the display position of the icon 550 of the own device, the participant can more easily operate the icon of the own device that is operated more frequently than the icons 552 to 556 of the other terminal devices and the icons 558, 560 indicating virtual sources.

Furthermore, in the first embodiment, the projector 100 displays individual images based on image information from the first PC 200 that transmitted participation request information, irrespective of whether there is an explicit display instruction or not. Meanwhile, individual images based on image information from the second and subsequent PCs 200 that transmitted participation request information are not displayed if there is no explicit display instruction, and these individual images are displayed when there is an explicit display instruction. Thus, even when participation requests or the like is accepted from the plural PCs 200, the overall image can be displayed properly and quickly.

For example, if the display device displays individual images based on image information from the second and subsequent PCs 200 that transmitted participation request information, the existing configuration of the overall image changes, causing disturbance to the presentation or the like. On the other hand, according to the first embodiment, the projector 100 can accept participation requests or the like from the second and subsequent PCs 200 without changing the existing configuration of the overall image. Also, for example, if the display device does not display individual images based on image information from all the PCs 200 that transmitted participation request information, the first PC 200 always needs to give an explicit display instruction and convenience is impaired. On the other hand, according to the first embodiment, the projector 100 can instantly display individual images based on image information from the first PC 200 that transmitted participation request information and therefore convenience is enhanced.

Second Embodiment

In the first embodiment, an example where a pattern image generating unit allocated as a virtual source is provided within each PC is described. However, embodiments of the invention are not limited to this. In a second embodiment, a pattern image generating unit allocated as a virtual source is provided in a projector. Such a projector in the second embodiment can be applied to the display system shown in FIG. 1. In this case, the display system is provided with PCs having a configuration without a pattern image generating unit, instead of the PCs 200-1 to 200-4.

Figure 13:
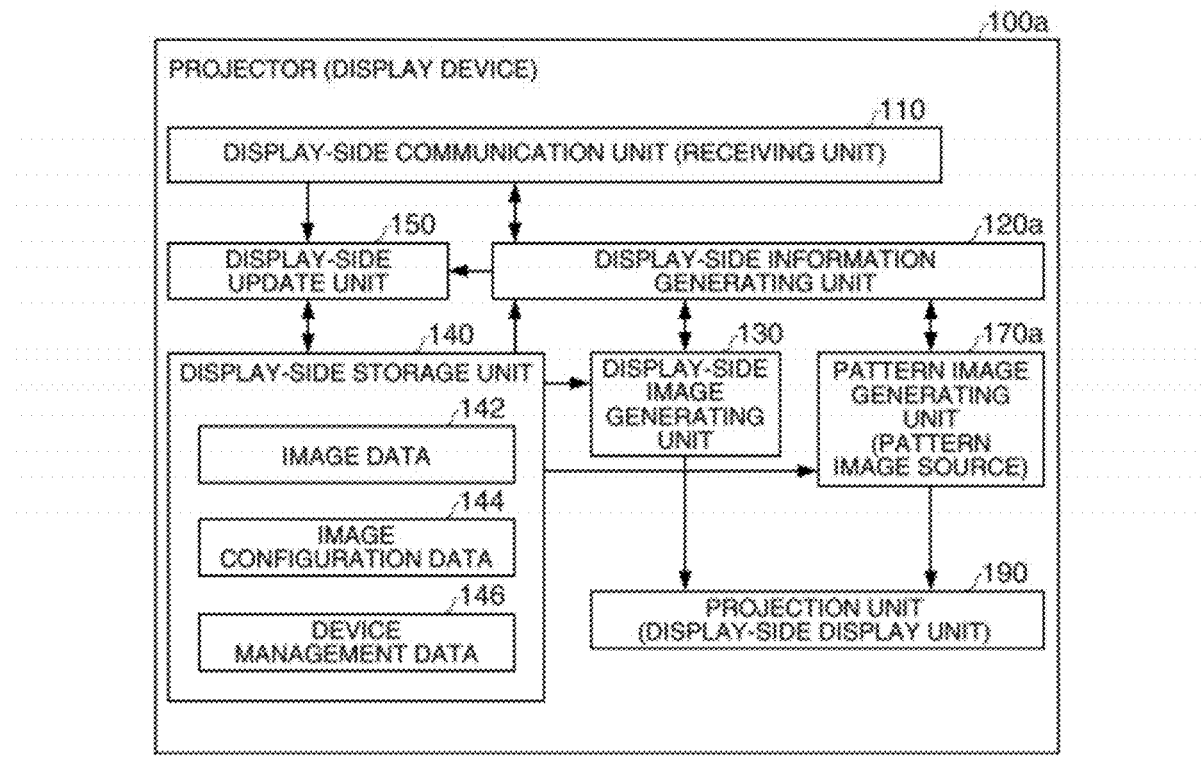
FIG. 13 is a functional block diagram showing an example of the configuration of a projector according to a second embodiment.

FIG. 13 shows a functional block diagram showing an example of the configuration of the projector according to the second embodiment. In FIG. 13, the same parts as in FIG. 2 are denoted by the same reference numerals and the description thereof is omitted where appropriate.

A projector 100a according to the second embodiment includes a display-side communication unit 110, a display-side information generating unit 120a, a display-side image generating unit 130, a display-side storage unit 140, a display-side update unit 150, a pattern image generating unit (pattern image source) 170a, and a projection unit 190. The projector 100a is different from the projector 100 shown in FIG. 2 in that the pattern image generating unit 170a is added and that processing by the display-side information generating unit 120a is different because of the addition of the pattern image generating unit 170a. The pattern image generating unit 170a generates image information corresponding to a predetermined pattern image. The predetermined pattern image may be a total black image, a total white image, user logo image or an image including text information. For example, the pattern image generating unit 170a generates image information using image data 142. The projection unit 190 projects an image generated by the display-side image generating unit 130 or a pattern image generated by the pattern image generating unit 170a, on a screen SCR.

The functions of each unit forming the projector 100a may be realized by hardware. For example, the functions of the display-side communication unit 110 are realized by a wireless communication unit or the like. The functions of the display-side information generating unit 120a and the display-side update unit 150 are realized by a CPU or the like. The functions of the display-side image generating unit 130 and the pattern image generating unit 170a are realized by an image processing circuit or the like. The functions of the display-side storage unit 140 are realized by a RAM or the like. The projection unit 190 is realized by a lamp, a liquid crystal panel, a liquid crystal drive circuit, a lens and the like.

Figure 14:
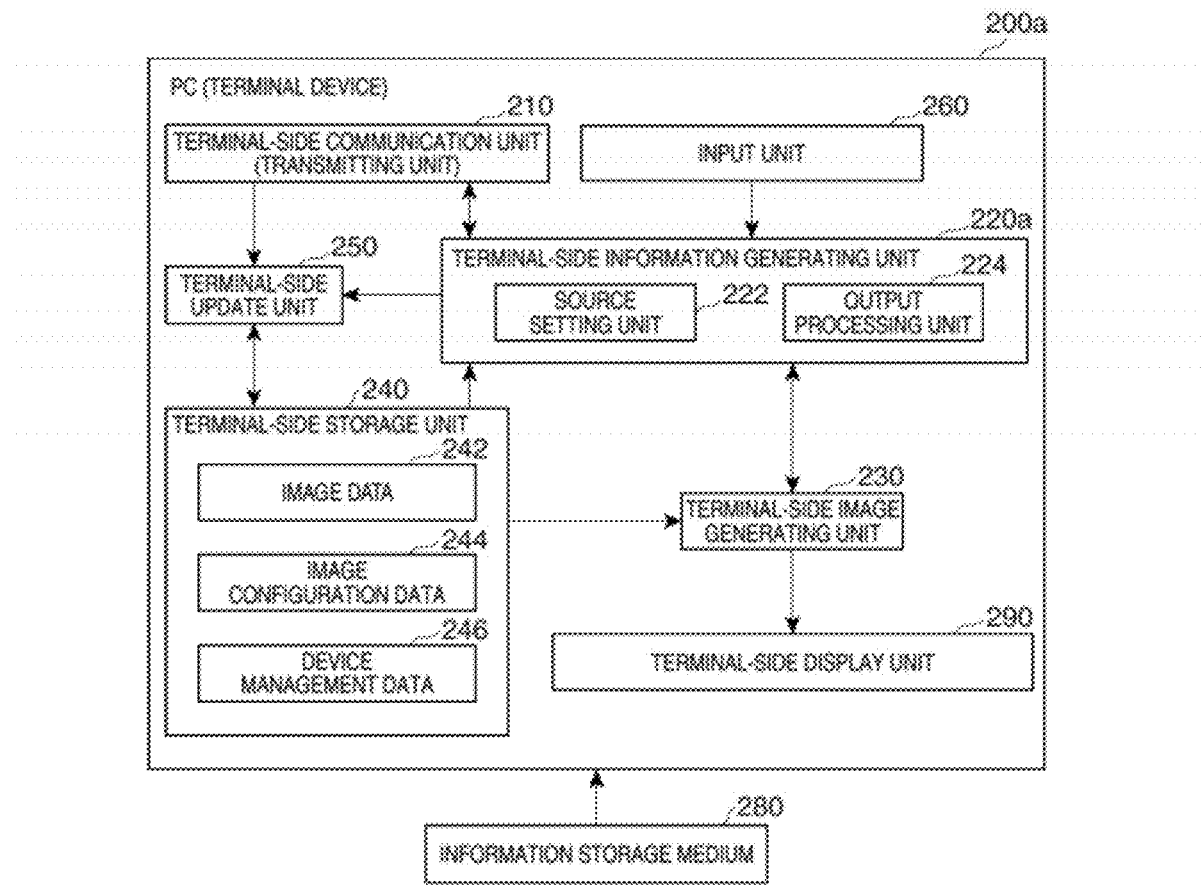
FIG. 14 is a functional block diagram showing an example of the configuration of a PC according to the second embodiment.

FIG. 14 shows a functional block diagram showing an example of the configuration of the PC in the second embodiment. The same parts as in FIG. 3 are denoted by the same reference numerals and the description thereof is omitted where appropriate.

A PC 200a includes a terminal-side communication unit 210, a terminal-side information generating unit 220a, a terminal-side image generating unit 230, a terminal-side storage unit 240, a terminal-side update unit 250, an input unit 260, and a terminal-side display unit 290. The terminal-side information generating unit 220a includes a source setting unit 222 and an output processing unit 224a. The PC 200a is different from the PC 200 shown in FIG. 3 in that the pattern image generating unit is omitted and that processing by the terminal-side information generating unit 220a is different because of the omission of the pattern image generating unit. The output processing unit 224a performs output processing of various kinds of information to the projector 100a. For example, the output processing unit 224a can gives an instruction to display a pattern image to the projector 100a according to a setting content of the source setting unit 222. The terminal-side display unit 290 displays an image generated by the terminal-side image generating unit 230.

The functions of each unit forming the PC 200a may be realized by hardware. For example, the functions of the terminal-side communication unit 210 are realized by a wireless communication unit or the like. The functions of the terminal-side information generating unit 220a and the terminal-side update unit 250 are realized by a CPU or the like. The functions of the input unit 260 are realized by a USB port or the like connected to a keyboard or mouse. The functions of the terminal-side image generating unit 230 are realized by an image processing circuit or the like. The functions of the terminal-side storage unit 240 are realized by a RAM or the like. The functions of the terminal-side display unit 290 are realized by a backlight, a liquid crystal panel and a liquid crystal drive circuit and the like. The computer of the PC 200a may function as the terminal-side image generating unit 230 or the like by reading a program stored in an information storage medium 280.

Next, a procedure for projecting an overall image 20 in response to a configuration change request for an image in the display system of the second embodiment will be described.

Figure 15:
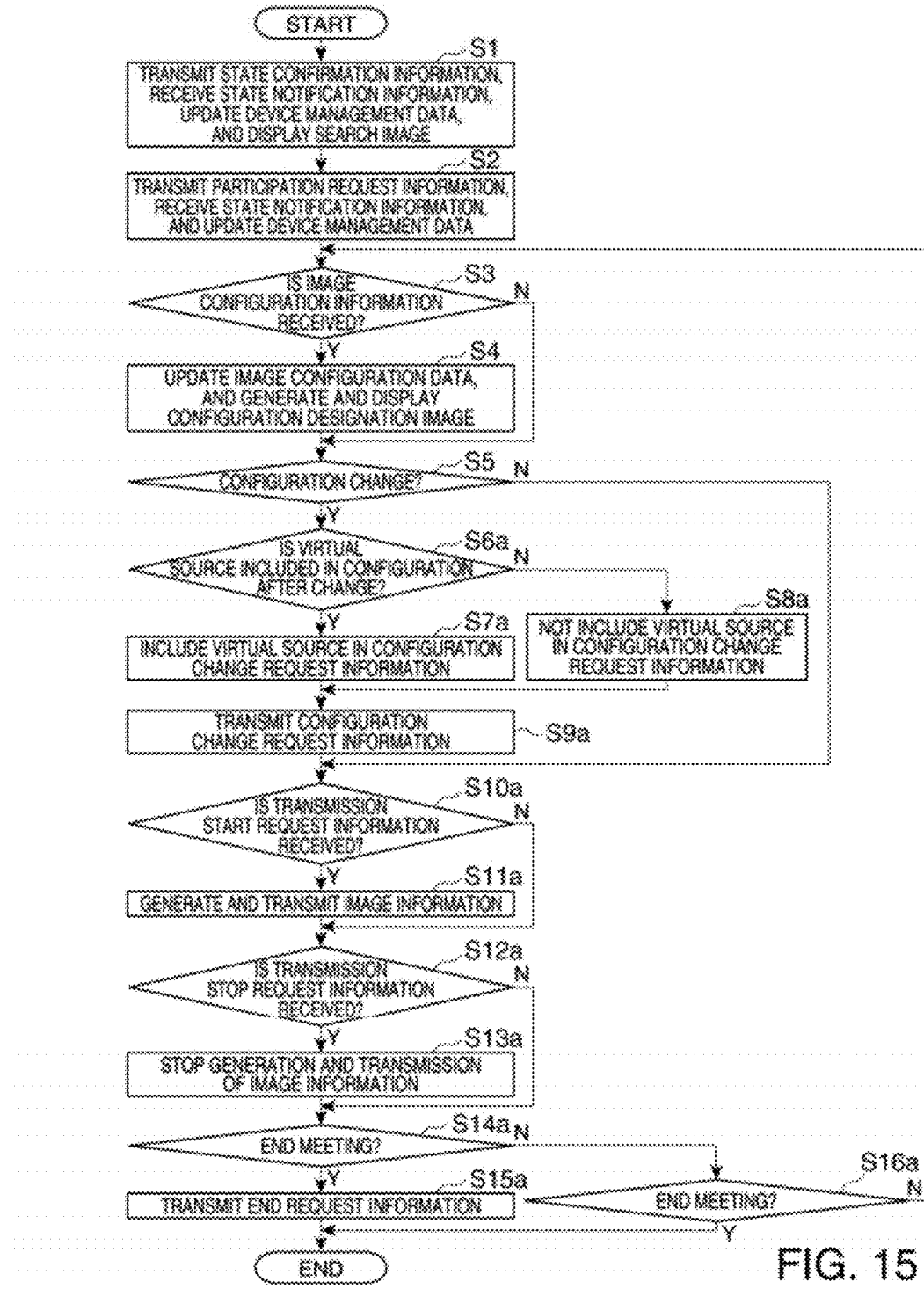
FIG. 15 is a flowchart showing an example of an image display procedure in the PC according to the second embodiment.

FIG. 15 shows a flowchart illustrating an example of an image display procedure in the PC 200a according to the second embodiment. In FIG. 15, the same steps as in FIG. 4 are denoted by the same reference numerals.

Figure 16:
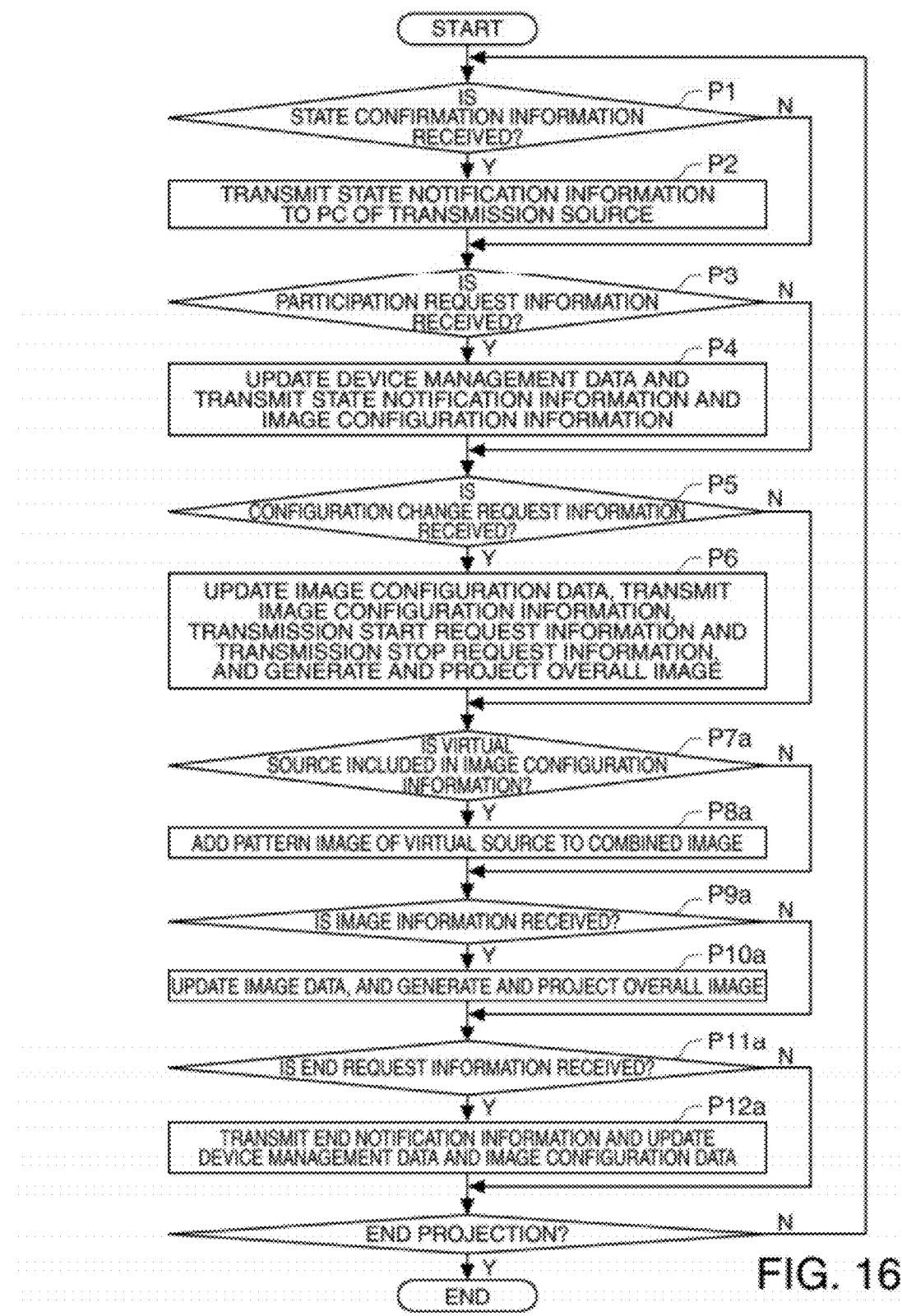
FIG. 16 is a flowchart showing an example of an image display procedure in the projector according to the second embodiment.

FIG. 16 shows a flowchart illustrating an example of an image display procedure in the projector 100a according to the second embodiment. In FIG. 16, the same steps as in FIG. 5 are denoted by the same reference numerals.

Figure 17:
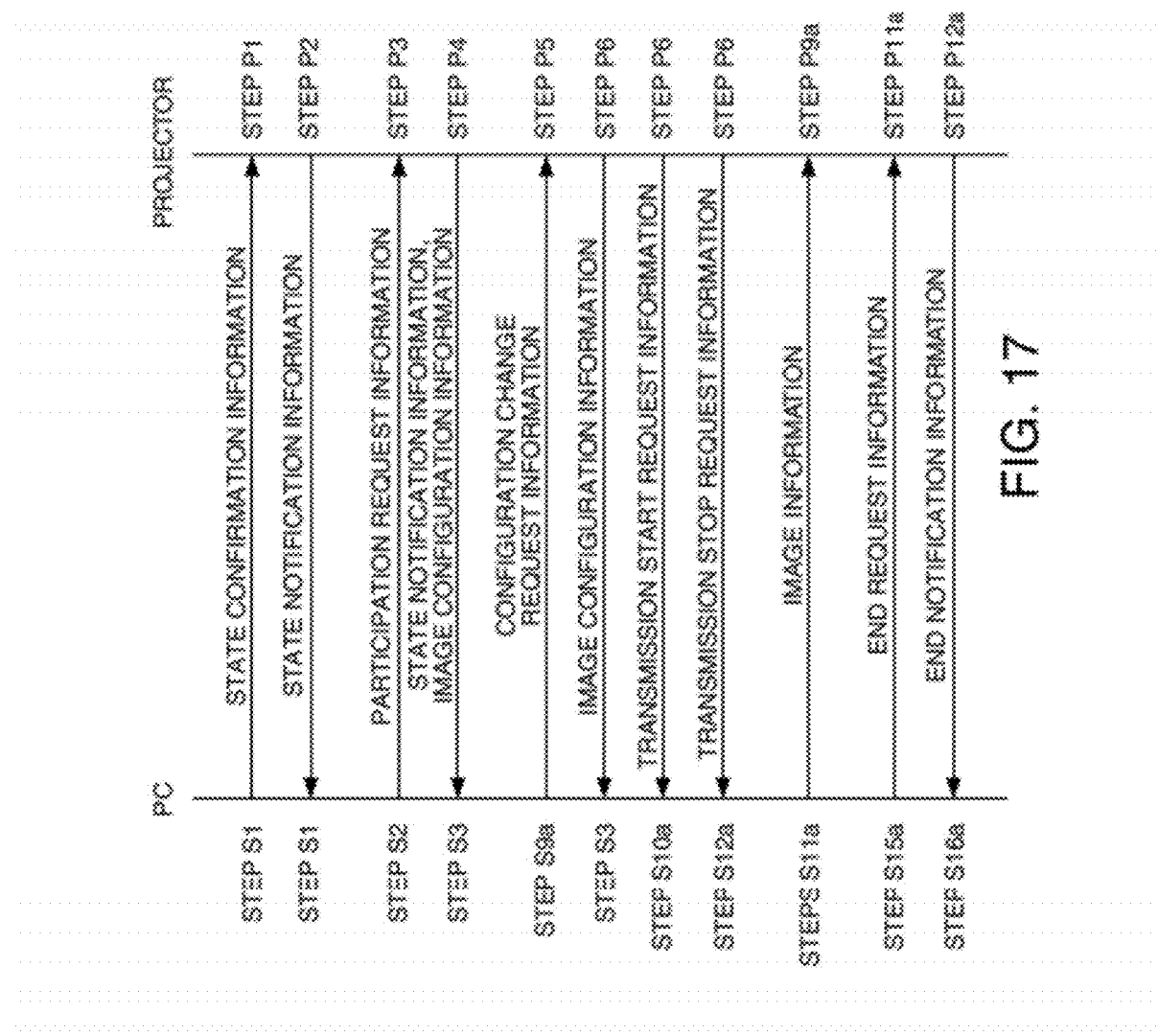
FIG. 17 is a sequence diagram showing exchange of information between the PC and the projector according to the second embodiment.

FIG. 17 shows a sequence diagram illustrating exchange of information between the PC 200a and the projector 100a according to the second embodiment. In FIG. 17, steps corresponding to FIG. 15 and FIG. 16 are shown as well.

First, the image display procedure in the PC 200a will be described with reference to FIG. 15. In FIG. 15, steps S1 to S5 are the same as step S1 to S5 shown in FIG. 4 and therefore will not be described further.

When there is a change in the configuration in step S5 (step S5: Y), the terminal-side information generating unit 220a determines whether the configuration after the change includes a virtual source or not (step S6a). When an icon of virtual source is included (step S6a: Y), the terminal-side information generating unit 220a generates configuration change request information including a virtual source, reflecting the result of designation by the source setting unit 222 (step S7a). When no icon of virtual source is included (step S6a: N), the terminal-side information generating unit 220a generates configuration change request information that does not include any virtual source, reflecting the result of designation by the source setting unit 222 (step S8a). After that the terminal-side communication unit 210 transmits the configuration change request information generated in step S7a or step S8a to the projector 100a (step S9a).

Following step S9a, or when there is no change in the configuration (step S5: N), the terminal-side information generating unit 220a determines whether transmission start request information for image information is received by the terminal-side communication unit 210 from the projector 100a or not (step S10a). When transmission start request information is received (step S10a: Y), the terminal-side image generating unit 230 generates image information representing the graph image or the like shown in FIG. 1 based on the image data 242. The terminal-side communication unit 210 transmits the image information to the projector 100a (step S11a). At this point, the terminal-side display unit 290 displays an image corresponding to the image information. In step S11a, when the configuration after the change includes a virtual source, the output processing unit 224a of the terminal-side information generating unit 220a performs processing to generate and designate display of a pattern image to the projector 100a. That is, when a change request in which an icon corresponding to a pattern image source is designated in relation to the position designation area is admitted on the basis of a response from the projector 100a, the output processing unit 224a performs processing to output an instruction to display the predetermined pattern image to the projector 100a.

Following step S11a, or when transmission start request information is not received (step S10a: N), the terminal-side information generating unit 220a determines whether transmission stop request information for image information is received by the terminal-side communication unit 210 from the projector 100a or not (step S12a). When transmission stop request information is received (step S12a: Y), the terminal-side image generating unit 230 stops generating image information and the terminal-side communication unit 210 stops transmitting image information (step S13a).

The participant can disconnect the communication of the participant's own PC 200a by selecting "Leave" from a sub-menu of "Tool" in the configuration designation image 500. Moreover, the participant can disconnect the communication of all the PCs 200a by selecting "End Meeting" from the sub-menu. Following step S13a, or in step S12a when transmission stop request information is not received (step S12a: N), the terminal-side information generating unit 220a determines whether "End Meeting" is selected or not, based on operation information from the input unit 260 (step S14a). When "End Meeting" is selected (step S14a: Y), the terminal-side information generating unit 220a generates end request information. The terminal-side communication unit 210 transmits the end request information to the projector 100a (step S15a).

When "End Meeting" is not selected (step S14a: N), the terminal-side information generating unit 220a determines whether end notification information transmitted from the projector 100a in response to the reception of end request information is received by the terminal-side communication unit 210 or not (step S16a). Following step S15a, or when end notification information is received (step S16a: Y), the PC 200a ends the series of processing (END). When end notification information is not received in step S16a (step S16a: N), the PC 200a returns to step S3 and repeats execution of the processing of steps S3 to S16a.

Next, the image display procedure in the projector 100a will be described with reference to FIG. 16. Steps p1 to P6 in FIG. 16 are the same as steps P1 to P6 in FIG. 4 and therefore will not be described further.

Following step P6, or when configuration change request information is not received in step P5 (step P5: N), the display-side information generating unit 120a determines whether the image configuration information includes a virtual source or not (step P7a). When a virtual source is included (step P7a: Y), the display-side update unit 150 updates the image configuration data 144 and performs processing to add a pattern image of the virtual source to the overall image (step P8a).

Following step P8a, or when no virtual source is included (step P7a: N), the display-side update unit 150 determines whether image information is received by the display-side communication unit 110 from the PC 200a or not (step P9a). When image information is received (step P9a: Y), the display-side update unit 150 updates the image data 142 based on the image information. In this case, the display-side image generating unit 130 generates image information based on the image data 142 and the image configuration data 144. Also, when a virtual source is included in step P7a, the pattern image generating unit 170a generates image information corresponding to the pattern image. The projection unit 190 projects the overall image 20 generated on the basis of the image information generated by the display-side generating unit 130 or the pattern image generating unit 170a, on the screen SCR (step P10a). Meanwhile, the display-side image generating unit 130 may also have the functions of the pattern image generating unit 170a. Moreover, the display-side image generating unit 130 may generate the overall image 20.

Following step P10a, or when image information is not received in step P9a (step P9a: N), the display-side information generating unit 120a determines whether end request information is received by the display-side communication unit 110 from the PC 200a or not (step P11a). When end request information is received (step P11a: Y), the display-side information generating unit 120a generates end notification information. The display-side communication unit 110 transmits the end notification information to each PC 200a. As the meeting ends, the display-side update unit 150 updates the device management data 146 and the image configuration data 144, for example, to initial states or the like (step P12a).

Following step P12a, or when end request information is not received in step P11a (step P11a: N), the projector 100a determines whether a projection end instruction is given or not (step P13a). When a projection end instruction is given (step P13a: Y), the projector 100a ends the foregoing series of processing (END). When a projection end instruction is not given (step P13a: N), the projector 100a returns to step P1 and the display-side information generating unit 120a determines whether state confirmation information is received by the display-side communication unit 110 from the PC 200a or not.

As described above, in the second embodiment, when image configuration information including a virtual source from the PC 200a is received by the projector 100a, the pattern image generating unit 170a provided in the projector 100a generates a pattern image. Thus, as the pattern image generating unit provided in the projector 100a is allocated virtually as an image source, a predetermined pattern image can be displayed in the overall image by an intuitive operation similar to handling of other image sources, as in the first embodiment.

Modifications

In the first embodiment or the second embodiment, an example of a display system including four PCs is described, as shown in FIG. 1. However, embodiments of the invention are not limited to this. A display system according to the invention may include three or less PCs, or five or more PCs.

Figure 18:
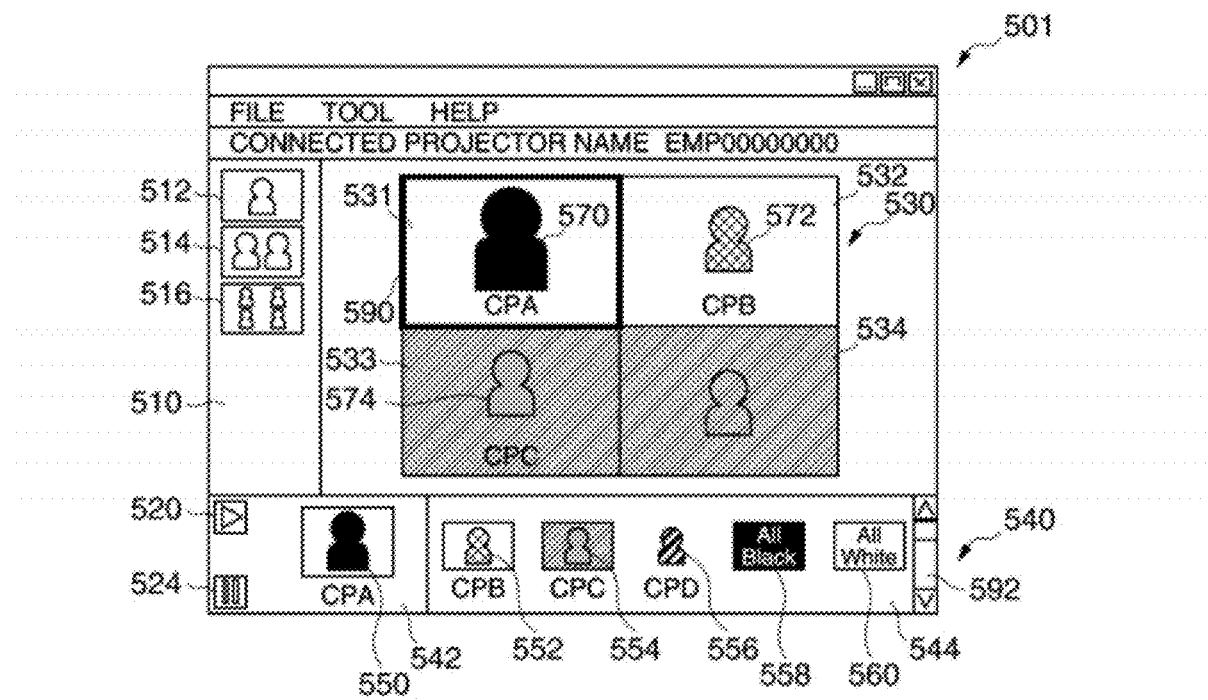
FIG. 18 shows an example of a configuration designation image according to a modification of the first embodiment and the second embodiment.

FIG. 18 shows an example of a configuration designation image according to a modification of the first embodiment or the second embodiment. In FIG. 18, the same parts as in FIG. 7 are denoted by the same reference numerals and the description thereof is omitted where appropriate.

For example, when the number of PCs 200 participating in the meeting is increased and the icons thereof cannot be displayed on the icon arrangement area 540, the terminal-side image generating unit 230 generates a configuration designation image 501 in which a scroll bar image 592 is added to the icon arrangement area 540. Thus, the participant can scroll the scroll bar image 592 and thereby can display the icon images of PCs 200 that cannot be displayed before scrolling.

The programs, the information storage medium, the terminal device and the display system or the like are described above according to one of the embodiments. However, the invention is not limited to one of the embodiments. For example, the invention can be carried out in various forms without departing from the scope of the invention and the following modifications can be made.

(1) In one of the embodiments or the modification thereof, an example in which a projector and each PC are arranged in the same room is described, as shown in FIG. 1. However, the invention is not limited to this. The projector and the PC may be arranged in different rooms.

(2) In one of the embodiments or the modification thereof, the display system is described as including one projector. However, the invention is not limited to this. For example, the display system according to the invention may include two or more projectors. In this case, one projector serves as a master and can control the other projector to project the same screen.

(3) In one of the embodiments or the modification thereof, the connection form between the projector and the PC is described as wireless connection. However, the invention is not limited to this. For example, the projector and the PC may be connected by wired connection via a LAN cable or the like.

(4) In one of the embodiments or the modification thereof, a projector is used as an example of the display device according to the invention. However, the invention is not limited to this. As the display device according to the invention, for example, a liquid crystal display, CRT (cathode ray tube), organic EL (electroluminescence) display, an electronic device having a projection function (for example, a digital camera or mobile phone) or the like may be used as well as a projector.

(5) In one of the embodiments or the modification thereof, a PC is used as an example of the terminal device according to the invention. However, the invention is not limited to this. As the terminal device according to the invention, for example, a mobile phone, personal digital assistant or the like may be used as well as a PC.

(6) The computer provided in the projector according to one of the embodiments or the modification thereof may read a program stored in an information storage medium and thus function as the display-side image generating unit 130 or the like. As such an information storage medium, for example, a CD-ROM, DVD-ROM, ROM, RAM, HDD or the like may be applied.

(7) The projector according to one of the embodiments or the modification thereof is not limited to a liquid crystal projector (transmitting type, reflecting type) and may be, for example, a projector using a digital micromirror device or the like. Also, the projection unit 190 may employ a self-luminous device including a solid-state light source such as an organic EL element, silicon light-emitting element, laser diode or LED (light emitting diode) instead of a lamp. The functions of the projector may be split to plural devices (for example, a PC and a projector or the like).

(8) In one of the embodiments or the modification thereof, an example in which a virtual source is provided within either a projector or a PC is described. However, the invention is not limited to this. For example, the functions of a pattern image generating unit as a virtual source may be split to the projector and the PC. Specifically, the projector may generate image information corresponding to a user logo image as a pattern image, and the PC may generate image information corresponding to a total black image or total white image as a pattern image.

(9) In one of the embodiments or the modification thereof, an example in which various icons as shown in FIG. 7 are displayed is described. However, the invention is not limited to this. For example, rectangular icons may be used and the invention is not limited to display forms of icons.

(10) In one of the embodiments or the modification thereof, the invention is described as a program, information storage medium, terminal device, and display device or the like. However, the invention is not limited to these. For example, the invention may include an image generating method for the PC according to one of the embodiments or the modification thereof, an image display method for the projector, a program that realizes the image display method, and a computer-readable information storage medium in which the program is stored, or the like.

What is claimed is:

1. A non-transitory information storage medium readable by a computer provided in a terminal device which is connected with a display device and sets an image to be displayed on the display device,
the information storage medium storing a program that causes the computer to function as:
an input unit to which operation information is inputted;
an image generating unit which generates
a configuration designation image including a plurality of position designation areas corresponding to a plurality of division display areas of a display area of the display device, and
an icon arrangement area where a plurality of icons corresponding to a plurality of images that can be designated in relation to the position designation areas are arranged;
a setting unit which designates an icon to be arranged in the icon arrangement area in relation to a position designation area on the basis of the operation information and thereby sets an image corresponding to the icon as a display image in a division display area of the display area; and
an output processing unit which makes a change request about designation of an image in relation to the position designation area to the display device, and performs processing to output image information to the display device according to a response to the change request,
wherein:
the icon includes a display icon corresponding to an image supplied from the terminal device connected with the display device and a muting icon corresponding to a predetermined pattern image for temporarily muting at least one of the division display areas displayed by the display device,
at least one of the images displayed by the display device in the division display areas is muted by inputting operation information to move the muting icon from the icon arranging area to be arranged in at least one position designation area corresponding to the at least one division display area to be muted, and
the processing to the output image information includes outputting the predetermined pattern image to be displayed in at least one of the plurality of division display areas of the display area and outputting an image other than the predetermined pattern image to be displayed as another of the plurality of division display areas of the display area.

2. The information storage medium according to claim 1, wherein the plural division display areas are formed by dividing a display area of an overall image displayed by the display device, and the icon arrangement area where one or plural icons corresponding to an image that can be designated in relation to each division display area are arranged, and
the setting unit sets an image designated in relation to each position designation area on the basis of the operation information, as a display image of a division display area corresponding to each position designation area.

3. The information storage medium according to claim 1, wherein the output processing unit performs processing to output image information corresponding to the predetermined pattern image to the display device when a change request in which the muting icon is designated in relation to the at least one position designation area is admitted on the basis of the response.

4. The information storage medium according to claim 1, wherein the output processing unit performs processing to output a display instruction for the predetermined pattern image to the display device when a change request in which the muting icon is designated in relation to the at least one position designation area is admitted on the basis of the response.

5. The information storage medium according to claim 1, wherein the predetermined pattern image is a total black image.

6. The information storage medium according to claim 1, wherein the predetermined pattern image is a total white image.

7. The information storage medium according to claim 1, wherein the predetermined pattern image is an image that is registered in advance.

8. The information storage medium according to claim 1, wherein the predetermined pattern image is an image corresponding to text information that is registered in advance.

9. A terminal device that is connected with a display device and sets an image to be displayed on the display device, the terminal device comprising:
an input unit to which operation information is inputted;
an image generating unit which generates a configuration designation image including a plurality of position designation areas corresponding to a plurality of division display areas of a display area of the display device and an icon arrangement area where a plurality of icons corresponding to a plurality of images that can be designated in relation to the position designation areas are arranged;

a setting unit which designates an icon to be arranged in the icon arrangement area in relation to a position designation area on the basis of the operation information and thereby sets an image corresponding to the icon as a display image in a division display area of the display area; and an output processing unit which makes a change request about designation of an image in relation to the position designation area to the display device, and performs processing to output image information to the display device according to a response to the change request, wherein:
the icon includes a display icon corresponding to an image supplied from the terminal device connected with the display device and a muting icon corresponding to a predetermined pattern image for temporarily muting at least one of the division display areas displayed by the display device,
at least one of the images displayed by the display device in the division display areas is muted by inputting operation information to move the muting icon from the icon arranging area to be arranged in at least one position designation area corresponding to the at least one division display area to be muted, and
the processing to the output image information includes outputting the predetermined pattern image to be displayed in at least one of the plurality of division display areas of the display area and outputting an image other than the predetermined pattern image to be displayed as another of the plurality of division display areas of the display area.

10. A display system comprising:
the terminal device according to claim 9; and
the display device which displays an image corresponding to the display icon or the muting icon in the display area.

11. The display system according to claim 10, wherein when a change request in which the muting icon is designated in relation to the at least one position designation area by the terminal device is admitted on the basis of a response from the display device,
the terminal device outputs image information corresponding to the predetermined pattern image to the display device, and the display device displays an image corresponding to the image information in the display area.

12. The display system according to claim 10, wherein when a change request in which the muting icon is designated in relation to the at least one position designation area by the terminal device is admitted on the basis of a response from the display device,
the display device displays an image in the display area on the basis of image information corresponding to the predetermined pattern image.

13. A method for controlling a terminal device which is connected with a display device, the method comprising:
inputting operation information to the terminal device;
generating a configuration designation image including a plurality of position designation areas corresponding to a plurality of division display areas of a display area of the display device and an icon arrangement area where a plurality of icons corresponding to a plurality of images that can be designated in relation to the position designation are arranged;
designating an icon to be arranged in the icon arrangement area in relation to a position designation area on the basis of the operation information and thereby sets an image corresponding to the icon as a display image in a division display area of the display area;
making a change request about designation of an image in relation to the position designation area to the display device; and
performing processing to output image information to the display device according to a response to the change request,
wherein:
the icon includes a display icon corresponding to an image supplied from the terminal device connected with the display device and a muting icon corresponding to a predetermined pattern image for temporarily muting at least one of the division display areas displayed by the display device,
at least one of the images displayed by the display device in the division display areas is muted by inputting operation information to move the muting icon from the icon arranging area to be arranged in at least one position designation area corresponding to the at least one division display area to be muted, and
the processing to the output image information includes outputting the predetermined pattern image to be displayed in at least one of the plurality of division display areas of the display area and outputting an image other than the predetermined pattern image to be displayed as another of the plurality of division display areas of the display area.

* * * * *